(12) United States Patent
Fujishiro et al.

(10) Patent No.: US 10,440,607 B2
(45) Date of Patent: Oct. 8, 2019

(54) BASE STATION AND USER TERMINAL

(71) Applicant: KYOCERA CORPORATION, Kyoto (JP)

(72) Inventors: Masato Fujishiro, Yokohama (JP); Chiharu Yamazaki, Tokyo (JP); Henry Chang, San Diego, CA (US); Amit Kalhan, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 8 days.

(21) Appl. No.: 15/725,765

(22) Filed: Oct. 5, 2017

(65) Prior Publication Data

US 2018/0049060 A1    Feb. 15, 2018

Related U.S. Application Data

(63) Continuation of application No. PCT/JP2016/061619, filed on Apr. 8, 2016.

(60) Provisional application No. 62/145,893, filed on Apr. 10, 2015.

(51) Int. Cl.
| | |
|---|---|
| *H04W 52/02* | (2009.01) |
| *H04W 28/06* | (2009.01) |
| *H04W 4/06* | (2009.01) |
| *H04W 76/11* | (2018.01) |
| *H04W 72/04* | (2009.01) |

(52) U.S. Cl.
CPC .............. *H04W 28/06* (2013.01); *H04W 4/06* (2013.01); *H04W 72/042* (2013.01); *H04W 76/11* (2018.02); *Y02D 70/00* (2018.01); *Y02D 70/10* (2018.01); *Y02D 70/12* (2018.01); *Y02D 70/126* (2018.01); *Y02D 70/1262* (2018.01); *Y02D 70/20* (2018.01); *Y02D 70/24* (2018.01)

(58) Field of Classification Search
CPC ........... H04W 52/0216; H04W 72/005; H04W 72/12; H04W 4/06; H04W 72/042; Y02D 70/1222; Y02D 70/1262; Y02D 70/142; Y02D 70/24; H04B 7/26
See application file for complete search history.

(56) References Cited

U.S. PATENT DOCUMENTS

| | | | |
|---|---|---|---|
| 8,913,538 B2* | 12/2014 | Lee ....................... | H04W 28/06 370/310 |
| 2009/0149164 A1* | 6/2009 | Cai ..................... | H04W 72/005 455/414.2 |
| 2010/0159822 A1 | 6/2010 | Lim et al. | |

(Continued)

FOREIGN PATENT DOCUMENTS

JP         2011-509549 A         3/2011

OTHER PUBLICATIONS

International Search Report issued in PCT/JP2016/061619; dated Jun. 21, 2016.

(Continued)

*Primary Examiner* — Mohamed A Kamara
(74) *Attorney, Agent, or Firm* — Studebaker & Brackett PC

(57) ABSTRACT

A base station according to one embodiment provides multicast service by SC-PTM transmission. The base station includes a controller configured to perform processing of transmitting SC-PTM configuration information related to a configuration of the SC-PTM transmission via a GCCH (SC-PTM control channel) which is a logical channel different from a MCCH. The GCCH is mapped on the DL-SCH.

6 Claims, 16 Drawing Sheets

(56) References Cited

U.S. PATENT DOCUMENTS

2013/0051301 A1* 2/2013 Xu .................. H04W 72/005
370/312
2018/0042033 A1* 2/2018 Xu .................. H04W 4/06

OTHER PUBLICATIONS

Huawei, HiSilicon, New Study Item Proposal for Support of single-cell point-to-multipoint transmission in LTE, 3GPP TSG RAN Meeting #66; RP-142205, Dec. 8-11, 2014, Maui, Hawaii, USA.
Qualcomm Incorporated, SC-PTM Configuration, Signalling, 3GPP TSG-RAN WG2#89, R2-150482, Feb. 9-13, 2015, Athens, Greece.
Nokia Networks, Nokia Corporation, Discussion and Working Assumptions for Single-cell PTM, 3GPP TSG-RAN WG2#89, R2-150513, Feb. 9-13, 2015, Athens, Greece.
Huawei, HiSilicon, SC-PTM configuration, 3GPP TSG-RAN WG2#89, R2-150254, Feb. 9-12, 2015, Athens, Greece.
MediaTek Inc, Group Scheduling for sc PTM, 3GPP TSG-RAN WG2#89, R2-150281, Feb. 9-13, 2015, Athens, Greece.
An Office Action issued by the Japanese Patent Office dated Oct. 31, 2017, which corresponds to Japanese Patent Application No. 2017-511112 and is related to U.S. Appl. No. 15/725,765; with English language Concise Explanation.
Kyocera, "Consideration of DRX in single-cell PTM transmission", 3GPP TSG-RAN WG2 #89, R2-150261, Feb. 9-13, 2015, Athens, Greece.

* cited by examiner

ID
BASE STATION AND USER TERMINAL

RELATED APPLICATION

This application is a continuation application of international application PCT/JP2016/061619, filed Apr. 8, 2016, which claims the benefit of U.S. Provisional Application No. 62/145,893 (filed on Apr. 10, 2015), the entire contents of which are incorporated herein by reference.

TECHNICAL FIELD

The present disclosure relates to a base station and a user terminal in a mobile communication system.

BACKGROUND ART

In the Third Generation Partnership Project (3GPP) which is a standardization project of a mobile communication system, Multimedia Broadcast Multicast Service (MBMS) is specified to provide multicast/broadcast service.

In the current MBMS, multicast/broadcast data is transmitted via a PMCH (Physical Multicast Channel) in units of a MBSFN (Multicast-Broadcast Single-Frequency Network) including a plurality of cells (MBSFN transmission).

Meanwhile, in order to provide efficient multicast service, SC-PTM (Single Cell Point to Multi-point) transmission is studied. According to the SC-PTM transmission, multicast data is transmitted in cell units via a PDSCH (Physical Downlink Shared Channel).

SUMMARY

A base station according to one embodiment provides multicast service by SC-PTM transmission. The base station includes a controller configured to perform processing of transmitting SC-PTM configuration information related to a configuration of the SC-PTM transmission via a GCCH (which may be referred to as a "SC-PTM control channel") which is a logical channel different from a MCCH. The GCCH is mapped on the DL-SCH.

A user terminal according to one embodiment provides multicast service by SC-PTM transmission. The user terminal includes a controller configured to perform processing of receiving SC-PTM configuration information related to a configuration of the SC-PTM transmission via a GCCH (which may be referred to as a "SC-PTM control channel") which is a logical channel different from a MCCH. The GCCH is mapped on the DL-SCH.

A base station according to one embodiment provides multicast service by SC-PTM transmission. The base station includes a controller configured to perform first transmission and retransmission by HARQ. A G-RNTI is allocated to a multicast group including a plurality of user terminals. The controller is configured to perform the first transmission by applying the G-RNTI.

A user terminal according to one embodiment provides multicast service by SC-PTM transmission. The user terminal includes a controller configured to perform processing of receiving first transmission and retransmission from a base station by HARQ. A G-RNTI is allocated to a multicast group including this user terminal. The controller is configured to perform the first transmission by applying the G-RNTI.

DESCRIPTION OF EMBODIMENTS

[Outline of Embodiments]

In a current MBMS, a MCCH (Multicast Control Channel) is defined as a logical channel for transmitting MBMS control information. The MCCH is mapped on a MCH (Multicast Channel), and the MCH is mapped on a PMCH. However, it is unclear what logical channel is used to transmit control information (SC-PTM configuration information) during the SC-PTM transmission.

In addition, it is unclear in what mode HARQ is applied when application of HARQ (Hybrid ARQ) to SC-PTM transmission is assumed.

A base station according to a first embodiment includes a controller configured to provide multicast service by SC-PTM (Single Cell Point to Multi-point) transmission. The controller is further configured to perform processing of transmitting SC-PTM configuration information related to a configuration of the SC-PTM transmission via a GCCH (Group Control Channel) which is a logical channel different from a MCCH (Multicast Control Channel). The SC-PTM control channel is mapped on a DL-SCH (Downlink Shared Channel).

A user terminal according to a first embodiment is a terminal for which multicast service is provided by SC-PTM (Single Cell Point to Multi-point) transmission. The user terminal includes a controller configured to perform processing of receiving SC-PTM configuration information related to a configuration of the SC-PTM transmission via a GCCH (Group Control Channel) which is a logical channel different from a MCCH (Multicast Control Channel). The SC-PTM control channel is mapped on a DL-SCH (Downlink Shared Channel).

A base station according to a second embodiment is configured to provide multicast service by SC-PTM (Single Cell Point to Multi-point) transmission. The base station includes a controller configured to perform processing of transmitting SC-PTM configuration information related to a configuration of the SC-PTM transmission via GCCH (Group Control Channel) which is a logical channel different from a MCCH (Multicast Control Channel). The GCCH is mapped on a DL-SCH (Downlink Shared Channel).

A user terminal according to a second embodiment is a terminal for which multicast service is provided by SC-PTM (Single Cell Point to Multi-point) transmission. The user terminal includes a controller configured to perform processing of receiving SC-PTM configuration information related to a configuration of the SC-PTM transmission via a GCCH (Group Control Channel) which is a logical channel different from a MCCH (Multicast Control Channel). The GCCH is mapped on a DL-SCH (Downlink Shared Channel).

[Outline of Mobile Communication System]

An outline of a LTE system which is a mobile communication system according to the embodiments will be described below.

(System Configuration)

Figure 1:
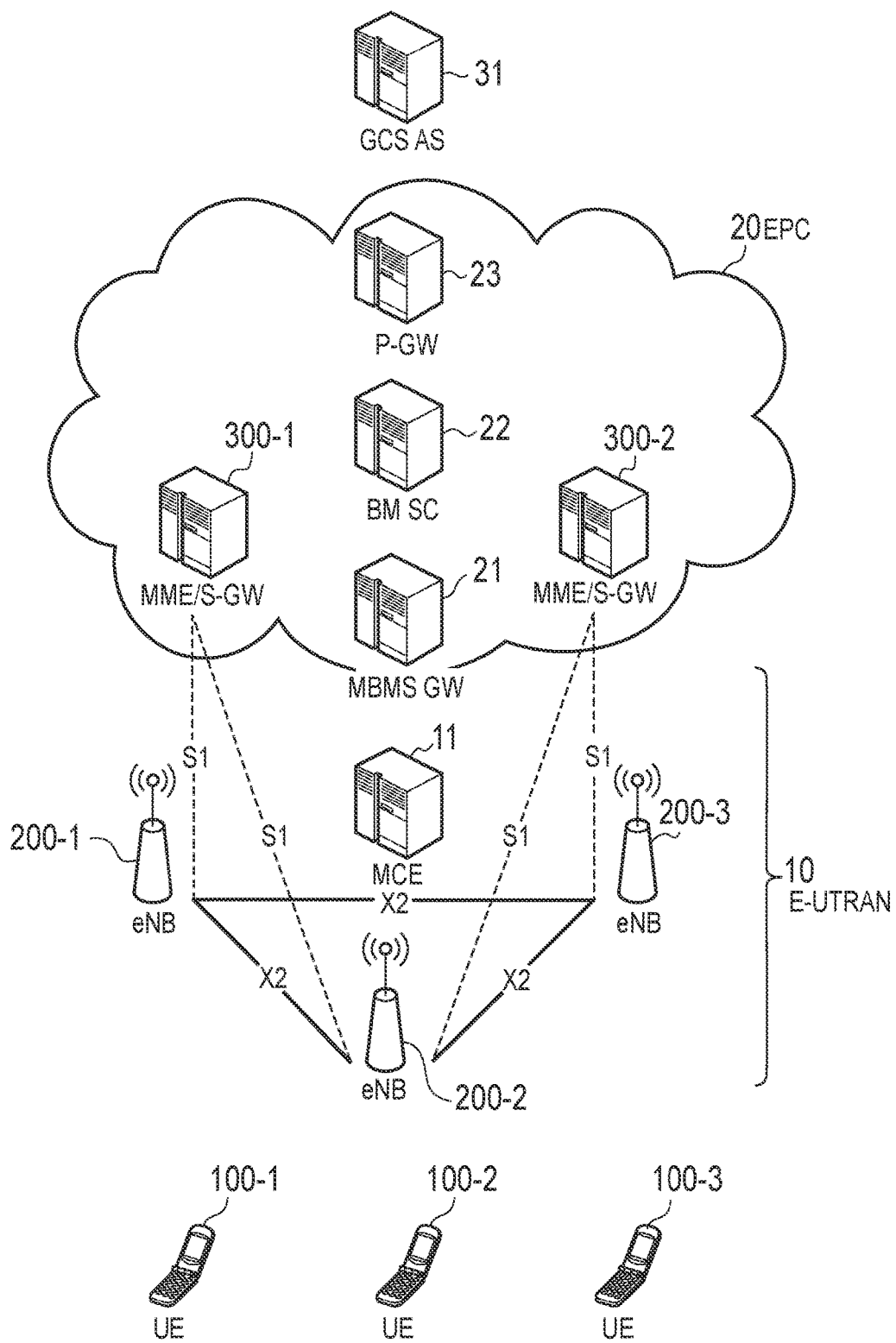
FIG. 1 is a view illustrating a configuration of an LTE system.
Figure 2:
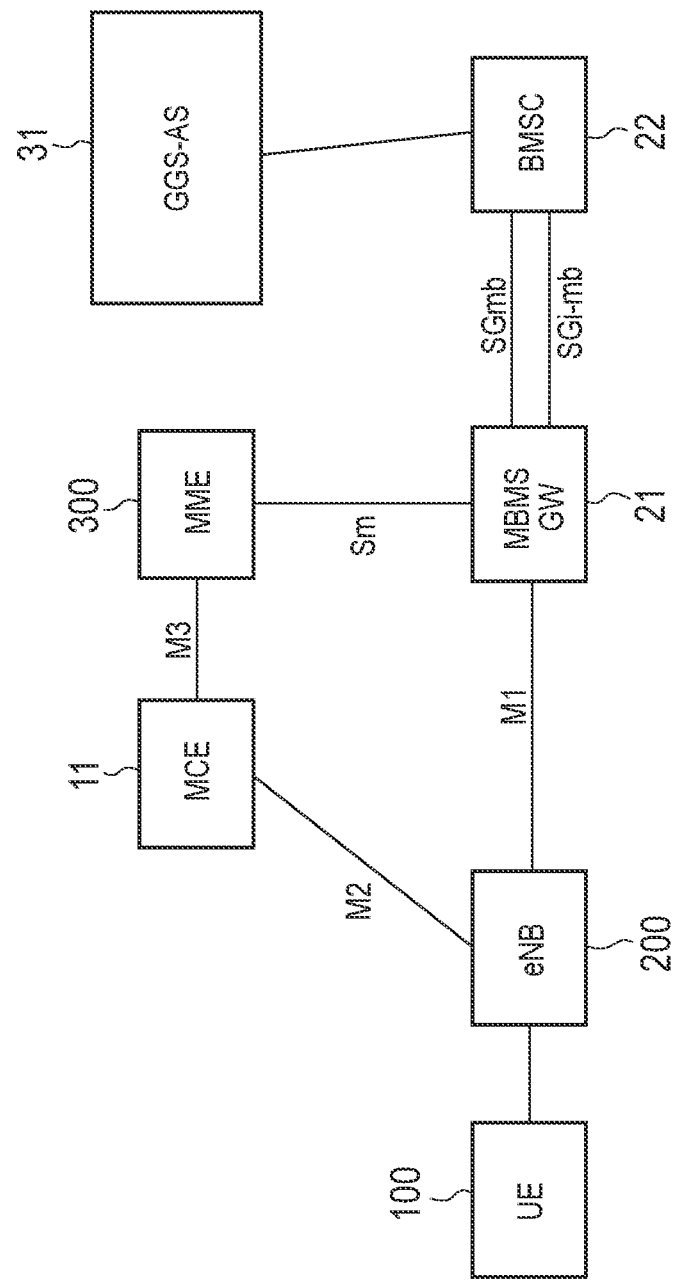
FIG. 2 is a view illustrating a network configuration relating to a MBMS/eMBMS.

FIG. 1 is a configuration diagram of the LTE system according to the embodiments. FIG. 2 is a view illustrating a network configuration of a MBMS/eMBMS according to the embodiments.

As illustrated in FIG. 1, the LTE system includes UEs (User Equipment) 100, an E-UTRAN (Evolved-Universal Terrestrial Radio Access Network) 10 and an EPC (Evolved Packet Core) 20.

Each UE 100 corresponds to a user terminal. The UE 100 is a mobile communication apparatus, and performs radio communication with cells (serving cells). A configuration of the UE 100 will be described below.

The E-UTRAN 10 corresponds to a radio access network. The E-UTRAN 10 includes eNBs 200 (evolved Node-B). Each eNB 200 corresponds to a base station. The eNBs 200 are connected with each other via an X2 interface. A configuration of each eNB 200 will be described below.

The eNB 200 manages one or a plurality of cells, and performs radio communication with the UEs 100 which have established connection with the cell of this eNB 200. The eNB 200 includes a radio resource managing (RRM) function, a user data (simply referred to as "data" below) routing function and a measurement control function for mobility control and scheduling. The "cell" is used not only as a term which indicates a minimum unit of a radio communication area, but also as a term indicating a function of performing radio communication with the UEs 100.

The EPC 20 corresponds to a core network. The EPC 20 includes a MME (Mobility Management Entity)/S-GW (Serving-Gateway) 300. Each MME performs various mobility control on the UEs 100. Each S-GW controls data transfer. Each MME/S-GW 300 is connected with each eNB 200 via a S1 interface. The E-UTRAN 10 and the EPC 20 configure a network of the LTE system.

In addition, the E-UTRAN 10 includes a MCE (Multi-Cell/Multicast Coordinating Entity) 11. The MCE 11 is connected to the eNB 200 via a M2 interface and is connected to the MME 300 via an M3 interface (see FIG. 2). The MCE 11 performs MBSFN radio resource management/allocation.

The EPC 20 includes a MBMS GW (Multimedia Broadcast Multicast Service Gateway) 21. The MBMS GW 21 is connected to the eNB 200 via the M1 interface, is connected to the MME 300 via a Sm interface, and is connected to a BM-SC 22 via SG-mb and SGi-mb interfaces (see FIG. 2). The MBMS GW 21 performs IP multicast data transmission and session control on the eNB 200.

The EPC 20 also includes the BM-SC (Broadcast Multicast Service Center) 22. The BM-SC 22 is connected to the MBMS GW 21 via the SG-mb and SGi-mb interfaces, and is connected to a P-GW 23 via a SGi interface (see FIG. 2). The BM-SC 22 mainly manages and allocates a TMGI (Temporary Mobile Group Identity).

Further, a GCS AS (Group Communication Service Application Server) 31 is provided in a network (i.e., the Internet) outside the EPC 20. The GCS AS 31 is an application server for group communication. The GCS AS 31 is connected to the BM-SC 22 via the MB2-U and MB2-C interfaces, and is connected to the P-GW 23 via the SGi interface. The GCS AS 31 manages groups and distributes data (including determination on whether to use a MBMS (multicast) bearer or a unicast bearer) for group communication.

(Configuration of Radio Protocol)

Figure 3:
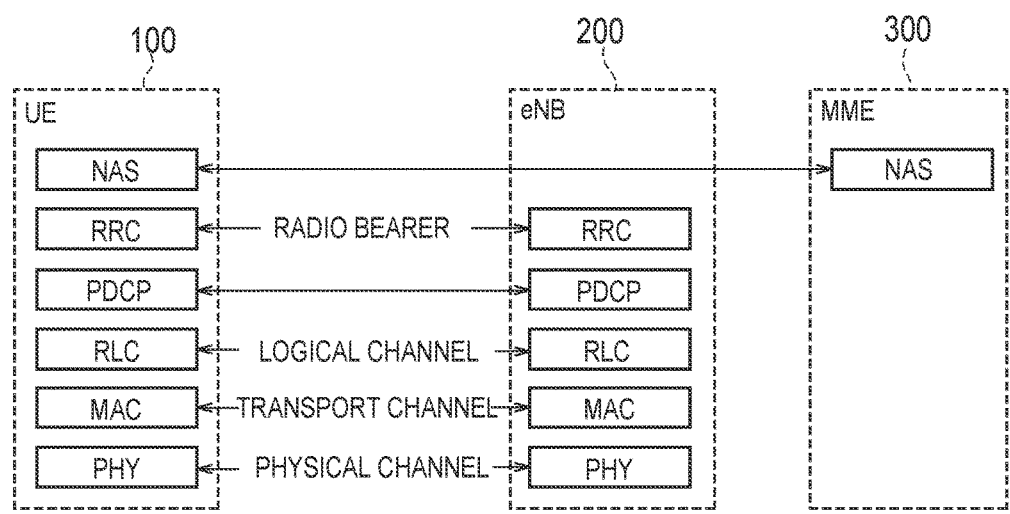
FIG. 3 is a protocol stack diagram of a radio interface of the LTE system.

FIG. 3 is a protocol stack diagram of a radio interface of the LTE system.

As illustrated in FIG. 3, a radio interface protocol is partitioned into a first layer to a third layer of an OSI reference model, and the first layer is a physical (PHY) layer. The second layer includes a MAC (Medium Access Control) layer, a RLC (Radio Link Control) layer and a PDCP (Packet Data Convergence Protocol) layer. The third layer includes a RRC (Radio Resource Control) layer.

In the physical layer, encoding, decoding, modulation, demodulation, antenna mapping, antenna demapping, resource mapping and resource demapping are performed. Data and control signals are transmitted between the physical layer of each UE 100 and the physical layer of each eNB 200 via a physical channel.

In the MAC layer, data prioritization control, retransmission control according to hybrid ARQ (HARQ), and a random access process are performed. Data and control signals are transmitted between the MAC layer of each UE 100 and the MAC layer of each eNB 200 via a transport channel. The MAC layer of each eNB 200 includes a scheduler which determines a transport format (a transport block size and a modulating/encoding method (MCS)) in uplink and downlink, and allocated resource blocks for each UE 100.

In the RLC layer, data is transmitted to the RLC layer at a reception side by using functions of the MAC layer and the physical layer. Data and control signals are transmitted between the RLC layer of each UE 100 and the RLC layer of each eNB 200 via a logical channel.

In the PDCP layer, header compression, header extension, encryption and decoding are performed.

The RRC layer is defined only in a control plane which handles a control signal. A message (RRC message) for various configurations is transmitted between the RRC layer of each UE 100 and the RRC layer of each eNB 200. In the RRC layer, a logical channel, a transport channel and a physical channel are controlled in response to establishment, reestablishment and release of a radio bearer. When the RRC of each UE 100 and the RRC of each eNB 200 are connected (RRC connection), each UE 100 is in a RRC connected state and, when this is not a case, each UE 100 is in a RRC idle state.

In a NAS (Non-Access Stratum) layer is a higher layer than the RRC layer, session management and mobility management are performed.

(Downlink Channel Configuration)

Figure 4A:
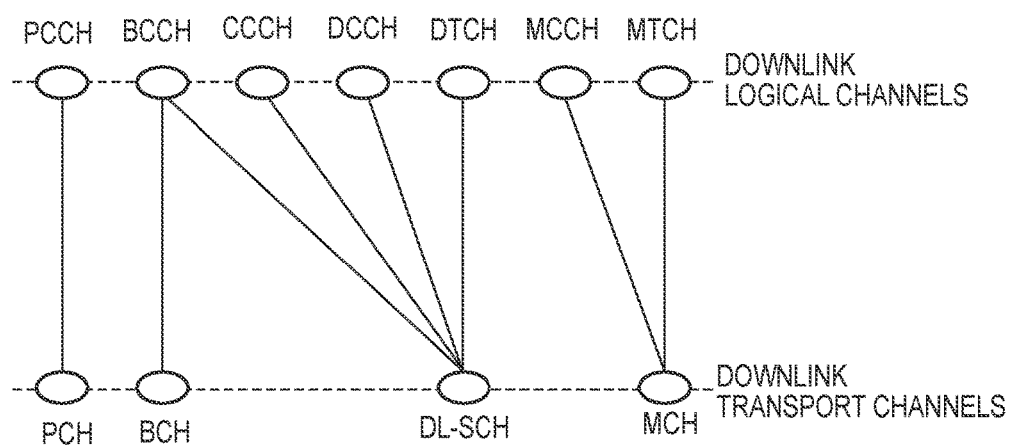
FIGS. 4A and 4B are views illustrating a downlink channel configuration in the LTE system.
Figure 4B:
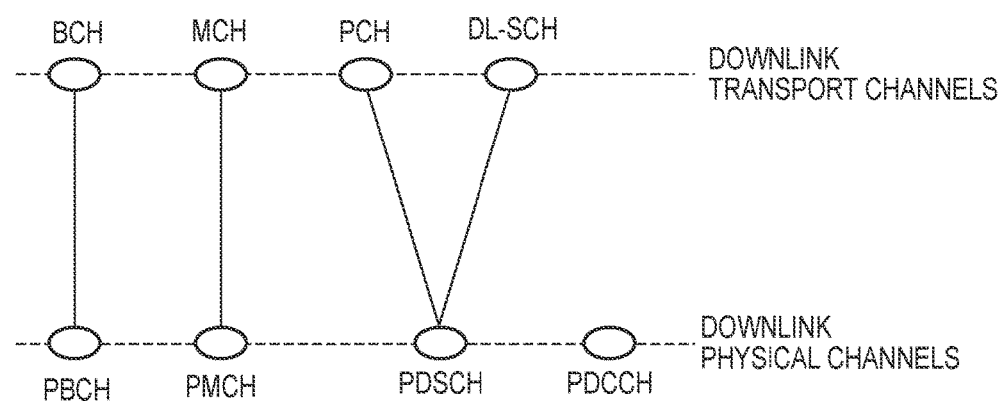

FIGS. 4A and 4B are views illustrating a downlink channel configuration in the LTE system.

FIG. 4A illustrates mapping between a logical channel (Downlink Logical Channel) and a transport channel (Downlink Transport Channel).

As illustrated in FIG. 4A, a PCCH (Paging Control Channel) is a logical channel for notifying paging information and system information change. The PCCH is mapped on a PCH (Paging Channel) which is a transport channel.

A BCCH (Broadcast Control Channel) is a logical channel for broadcast system information. The BCCH is mapped on a BCH (Broadcast Control Channel) or a DL-SCH (Downlink Shared Channel) which is a transport channel.

A CCCH (Common Control Channel) is a logical channel for transmission control information between each UE 100 and each eNB 200. The CCCH is used when each UE 100 does not establish RRC connection with the network. The CCCH is mapped on the DL-SCH.

A DCCH (Dedicated Control Channel) is a logical channel for transmitting individual control information between each UE 100 and the network. The DCCH is used when each UE 100 establishes RRC connection. The DCCH is mapped on the DL-SCH.

A Dedicated Traffic Channel (DTCH) is an individual logical channel for data transmission. The DTCH is mapped on the DL-SCH.

A MCCH (Multicast Control Channel) is a logical channel for one-to-many (multicast/broadcast) transmission. The MCCH is used to transmit MBMS control information for a MTCH from the network to each UE 100. The MCCH is mapped on a MCH (Multicast Channel) which is a transport channel.

A MTCH (Multicast Traffic Channel) is a logical channel for one-to-many (multicast/broadcast) data transmission from the network to each UE 100. The MTCH is mapped on a MCH.

FIG. 4B illustrates mapping between a transport channel (Downlink Transport Channel) and a physical channel (Downlink Physical Channel).

As illustrated in FIG. 4B, the BCH is mapped on a PBCH (Physical Broadcast Channel).

The MCH is mapped on a PMCH (Physical Multicast Channel). The MCH supports MBSFN transmission from multiple cells.

The PCH and the DL-SCH are mapped on a PDSCH (Physical Downlink Shared Channel). The DL-SCH supports HARQ, link adaptation, and dynamic resource allocation.

The PDCCH carries resource allocation information of the PDSCH (DL-SCH, PCH) and HARQ information related to the DL-SCH. Also, the PDCCH carries an uplink scheduling grant.

(Configuration of Radio Frame)

Figure 5:
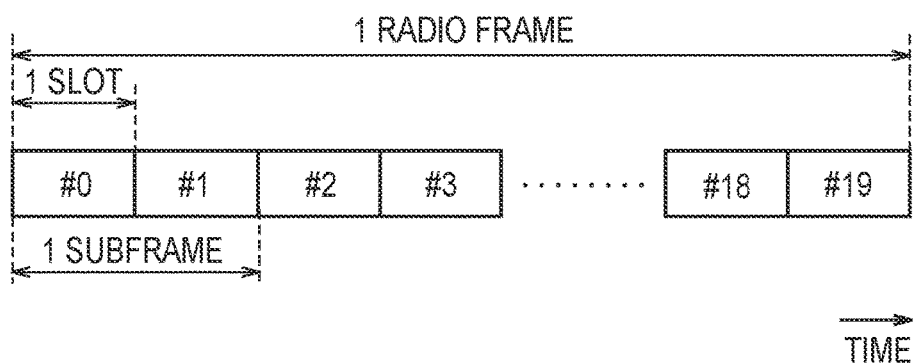
FIG. 5 is a configuration diagram of a radio frame used in the LTE system.

FIG. 5 is a configuration diagram of a radio frame used in the LTE system. The LTE system applies OFDMA (Orthogonal Frequency Division Multiplexing Access) to downlink and applies SC-FDMA (Single Carrier Frequency Division Multiple Access) to uplink.

As illustrated in FIG. 5, a radio frame is configured by 10 subframes aligned in a time domain. Each subframe is configured by two slots aligned in the time domain. A length of each subframe is 1 ms, and a length of each slot is 0.5 ms. Each subframe includes a plurality of resource blocks (RB) in a frequency domain, and includes a plurality of symbols in the time domain. Each resource block includes a plurality of subcarriers in the frequency domain. One symbol and one subcarrier configure one resource element (RE). Among radio resources (time and frequency resources) allocated to each UE 100, a frequency resource can be specified based on a resource block, and a time resource can be specified based on a subframe (or a slot).

An interval of several head symbols of each subframe in downlink is a domain which is used as a PDCCH for mainly transmitting control signals. The remaining portion of each subframe is a domain which can be used as a PDSCH for mainly transmitting downlink data. Further, in downlink, a MBSFN subframe which is a subframe for MBSFN transmission can be set.

Both ends of each subframe in the frequency domain in the uplink are domains which are used as a PUCCH for mainly transmitting control signals. The remaining portion of each subframe is a domain which can be used as a PUSCH for mainly transmitting uplink data.

(Configuration of User Terminal)

Figure 6:
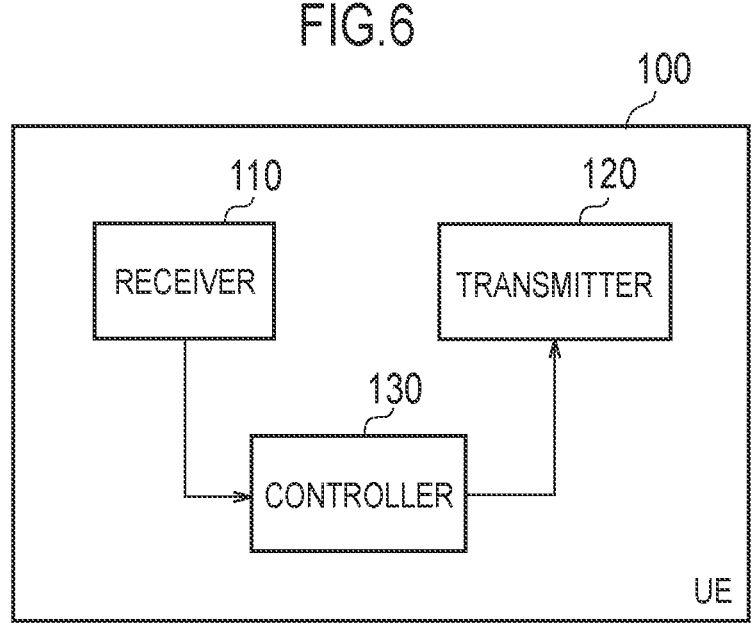
FIG. 6 is a block diagram of a UE 100 (user terminal) according to embodiments.

FIG. 6 is a block diagram of the UE 100 (user terminal) according to the embodiments.

As illustrated in FIG. 6, the UE 100 includes a receiver 110, a transmitter 120, and a controller 130.

The receiver 110 performs various types of reception under control of the controller 130. The receiver 110 includes an antenna and a receiver. Further, the receiver converts a radio signal received at the antenna into a baseband signal (received signal) to output to the controller 130.

The transmitter 120 performs various types of transmission under control of the controller 130. The transmitter 120 includes an antenna and a transmitter. The transmitter converts a baseband signal (transmission signal) outputted from the controller 130 into a radio signal to transmit from each antenna.

The controller 130 performs various types of control in the UE 100. The controller 130 includes a processor and a memory. The memory stores programs executed by the processor and information used for processing performed by the processor. The processor includes a baseband processor which modules, demodulates, encodes and decodes baseband signals, and a CPU (Central Processing Unit) which executes the programs stored in the memory to execute various types of processing. The processor may further include a codec which encodes and decodes audio and video signals. The processor executes the above various communication protocols and various types of processing described below.

(Configuration of Base Station)

Figure 7:
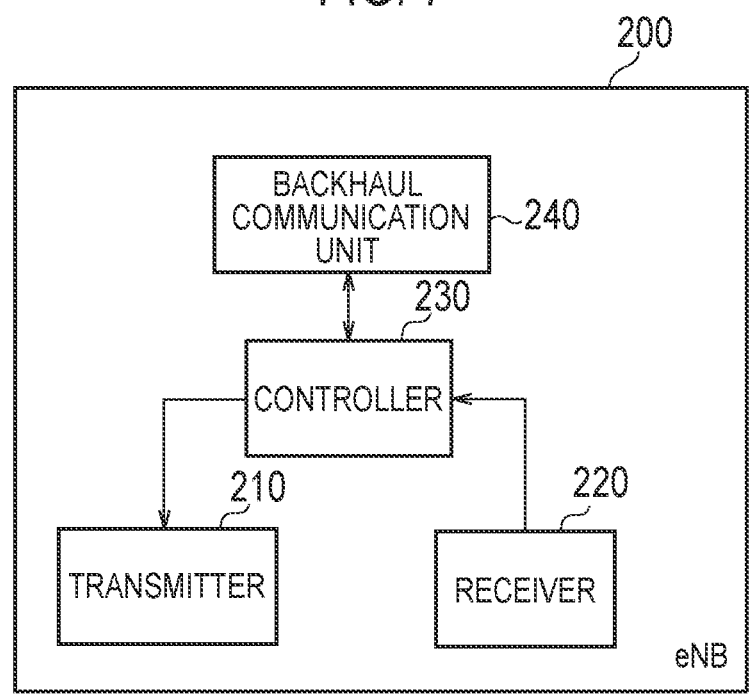
FIG. 7 is a block diagram of an eNB 200 (base station) according to the embodiments.

FIG. 7 is a block diagram of the eNB 200 (base station) according to the embodiments.

As illustrated in FIG. 7, the eNB 200 includes a transmitter 210, a receiver 220, a controller 230, and a backhaul communication unit 240.

The transmitter 210 performs various types of transmission under control of the controller 230. The transmitter 210 includes an antenna and a transmitter. The transmitter converts a baseband signal (transmission signal) outputted from the controller 230 into a radio signal to transmit from the antenna.

The receiver 220 performs various types of reception under control of the controller 230. The receiver 220 includes an antenna and a receiver. The receiver converts the radio signal received at the antenna into a baseband signal (received signal) to output to the controller 230.

The controller 230 performs various types of control in the eNB 200. The controller 230 includes a processor and a memory. The memory stores programs executed by the processor and information used for processing performed by the processor. The processor includes a baseband processor which modules, demodulates, encodes and decodes baseband signals, and a CPU (Central Processing Unit) which executes the programs stored in the memory to execute various types of processing. The processor executes the above various communication protocols and various types of processing described below.

The backhaul communication unit 240 is connected with a neighboring eNBs via the X2 interface, and is connected with the MME/S-GWs 300 via the S1 interface. The backhaul communication unit 240 is used for communication performed on the X2 interface, and communication performed on the S1 interface.

[First Embodiment]

The first embodiment will be described below.

(Outline of SC-PTM Transmission)

Figure 8:
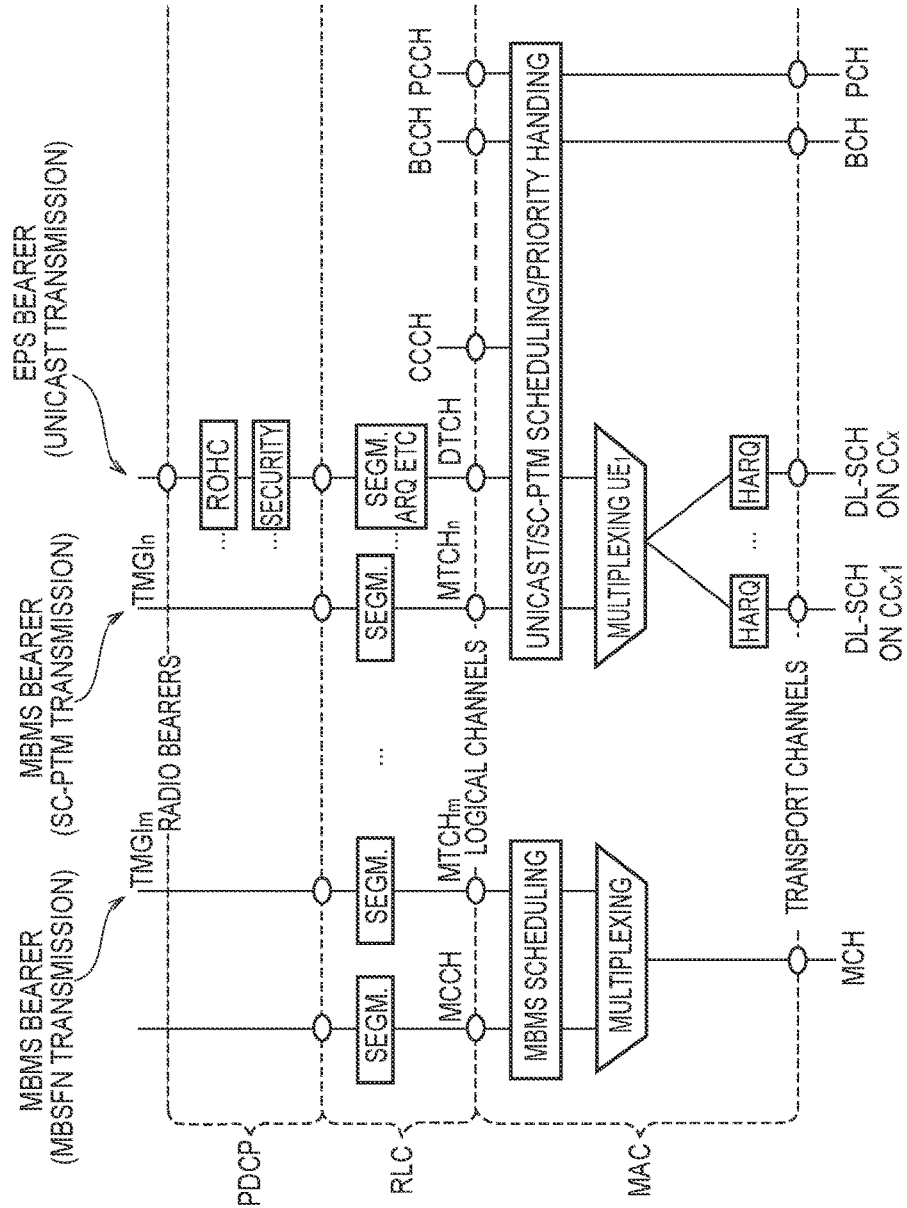
FIG. 8 is a view for explaining an outline of SC-PTM transmission according to a first embodiment.

FIG. 8 is a view for explaining the outline of the SC-PTM transmission according to the first embodiment. Here, processing in the eNB 200 will be mainly described. The eNB 200 according to the first embodiment provides multicast service by SC-PTM transmission.

As illustrated in FIG. 8, the controller 230 (e.g., the RRC layer) of the eNB 200 transmits SC-PTM configuration information related to a configuration of SC-PTM transmission via a GCCH (Group Control Channel) which is a new logical channel mapped on the DL-SCH. The details of the SC-PTM configuration information will be described below.

Further, the controller 230 (e.g., RRC layer) of the eNB 200 performs processing of transmitting the GCCH configuration information related to the configuration of the GCCH via the BCCH. Details of the GCCH configuration information will be described below.

In addition, the MBMS bearer to which the SC-PTM transmission is applied is associated with a TMGI (Temporary Mobile Group Identity) indicating multicast service (MBMS service). Here, the MBMS bearer is a broadcast/multicast bearer established between the UE 100 and the BM-SC 22. For example, for given MBMS service, an IP multicast bearer is established between the MBMS GW 21 and the eNB 200, and a MBMS PTM radio bearer is established between the eNB 200 and the UE 100.

The MBMS bearer to which SC-PTM transmission is applied is segmented in the RLC layer and then is mapped on a MTCH which is a logical channel. A UM (Unacknowledged Mode) may be applied to SC-PTM transmission in the RLC layer, and ARQ processing may not be performed. The MTCH exists per TMGI. That is, the TMGI is associated with a LCID which is the identifier of the logical channel.

An Evolved Packet System (EPS) bearer to which unicast transmission is applied is subjected to ROHC processing and security processing in the PDCP layer, is subjected to segmentation and ARQ processing in the RLC layer, and then is mapped on the DTCH which is a logical channel. Here, the EPS bearer is a bearer for unicast established between the UE 100 and the P-GW 23.

The controller 230 (MAC layer) of the eNB 200 performs unicast/SC-PTM scheduling and priority control (Priority Handling) on each logical channel of the MTCH, the DTCH, the CCCH, the GCCH, the BCCH, and the PCCH. Also, the controller 230 (MAC layer) of the eNB 200 multiplexes (Multiplexing) the MTCH and the DTCH, performs HARQ processing on the MTCH and the DTCH, and then maps the MTCH and the DTCH on the DL-SCH of each component carrier (CC).

Further, the eNB 200 may provide broadcast/multicast service by MBSFN transmission. The controller 230 (MAC layer) of the eNB 200 performs MBMS scheduling on the MCCH and the MTCH by referring to MBMS scheduling information received from the MCE 11, then multiplexes (Multiplexing) the MCCH and the MTCH, and maps the MCCH and the MTCH on the MCH.

(Operation Sequence)

Figure 9:
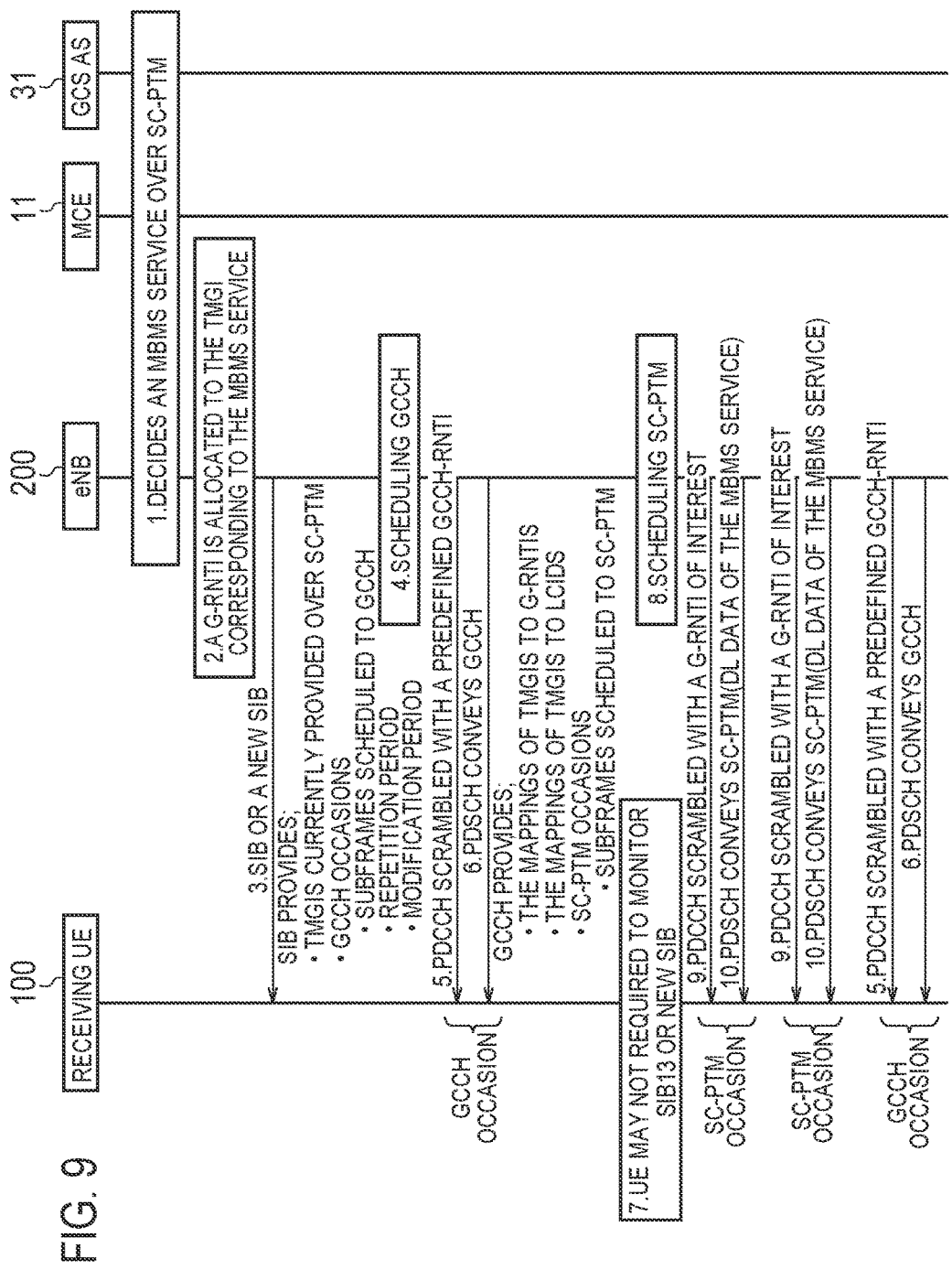
FIG. 9 is a sequence diagram illustrating a SC-PTM control procedure according to the first embodiment.

FIG. 9 is a sequence diagram illustrating the SC-PTM control procedure according to the first embodiment.

As illustrated in FIG. 9, in step 1, the eNB 200, the MCE 11, or the GCS AS 31 determines to provide the MBMS service (multicast service) by SC-PTM transmission. Alternatively, the MME 300 or the BM SC 22 may make this determination.

In step 2, the eNB 200 allocates a G-RNTI (Group-Radio Network Temporary Identifier) to the TMGI corresponding to the MBMS service.

In step 3, the eNB 200 transmits the GCCH configuration information related to the GCCH via the BCCH. More specifically, the eNB 200 transmits the GCCH configuration information by a SIB (System Information Block) type 13 or a new SIB.

The GCCH configuration information may include TMGI (TMGIs currently provided over SC-PTM) of all the multicast services provided by the SC-PTM transmission in the own cell. As a result, the UE 100 which has received the GCCH configuration information can determine to receive the GCCH when the GCCH configuration information includes the TMGI which the UE 100 is interested in.

Also, the GCCH configuration information includes "GCCH occasions". The "GCCH occasions" includes information (Subframes scheduled to GCCH) indicating a subframe in which the GCCH is likely to be transmitted. As a result, the UE 100 which has received the GCCH configuration information can appropriately receive the GCCH when determining to receive the GCCH.

Further, the "GCCH occasion" includes a modification period (Modification period) indicating a period during which the GCCH (SC-PTM configuration information) is not changed, and a repetition period (Repetition period) indicating a cycle in which the same GCCH (SC-PTM configuration information) is repeatedly transmitted in the "Modification period". As a result, the UE 100 which has received the GCCH configuration information can omit unnecessary monitoring of the GCCH, and consequently can reduce power consumption.

Preferably, the eNB 200 maintains the SC-PTM bearer without changing the SC-PTM bearer in the "Modification period". The SC-PTM bearer is an MBMS bearer (or radio bearer) to which SC-PTM transmission is applied.

In step 4, the eNB 200 schedules the GCCH according to the "Modification period" and the "Repetition period" (and/or "GCCH occasions").

In step 5, the eNB 200 transmits first resource allocation information (DCI: Downlink Control Information) for transmitting the SC-PTM configuration information in the "GCCH occasions" (more specifically, a subframe in which the GCCH is likely to be transmitted) via the PDCCH. The first resource allocation information includes information indicating an allocated resource block for the PDSCH in the subframe.

A common RNTI (GCCH-RNTI) is applied to a plurality of multicast groups to transmit the first resource allocation information. More specifically, the PDCCH is scrambled/masked by using the GCCH-RNTI. The "GCCH-RNTI" may be a RNTI configured in advance to the UE 100, or may be configured to the UE 100 by eNB 200. Alternatively, the RNTI (G-RNTI) unique to the multicast group may be applied to transmit the first resource allocation information.

In step 6, the eNB 200 transmits the SC-PTM configuration information related to the configuration of the SC-PTM transmission via the GCCH. As described above, the GCCH is mapped on the PDSCH (DL-SCH).

The SC-PTM configuration information includes information indicating the correspondence (mapping) between the TMGI indicating MBMS service (multicast service) and the G-RNTI (Group-Radio Network Temporary Identifier) used to provide the MBMS service. As a result, the UE 100 which has received the SC-PTM configuration information can grasp the G-RNTI allocated to the TMGI to which the UE 100 is interested.

In addition, the SC-PTM configuration information includes information indicating a correspondence (mapping) between TMGI indicating the MBMS service (multicast service) and an identifier (LCID) of a logical channel used to provide the MBMS service. As a result, the UE 100 which has received the SC-PTM configuration information can grasp the LCID allocated to the TMGI which the UE 100 is interested in.

Further, the SC-PTM configuration information includes "SC-PTM occasions". The "SC-PTM occasions" includes information (Subframes scheduled to SC-PTM) indicating a subframe in which multicast data (SC-PTM data) is likely to be transmitted by SC-PTM transmission. Consequently, the UE 100 which has received the SC-PTM configuration information can grasp a timing (subframe) at which the SC-PTM data needs to be received.

In the case where SPS (Semi-Persistent Scheduling) is applied to the SC-PTM transmission, the SC-PTM configuration information may include SPS configuration information (SPS Config.). The "SPS ConFig." includes the SPS cycle (semiPersistSchedInterval) and the SPS C-RNTI.

In step 7, the UE 100 which has received the SC-PTM configuration information (GCCH) may not receive the GCCH configuration information (the SIB 13 or a new SIB) as long as the SIB is not updated. Also, once the UE 100 receives the SC-PTM configuration information (GCCH) in the "Modification period", the UE 100 does not need to monitor the GCCH in the "Modification period".

In step 8, the eNB 200 schedules the SC-PTM.

In step 9, the eNB 200 transmits second resource allocation information (DCI) for transmitting SC-PTM data corresponding to specific service (TMGI) in the "SC-PTM occasions" (a subframe in which SC-PTM data is likely to be transmitted) via the PDCCH. The second resource allocation information includes information indicating allocation resources (and a MCS) used to transmit the SC-PTM data.

A different G-RNTI is applied per multicast group to transmit the second resource allocation information. More specifically, the PDCCH is scrambled/masked by using the G-RNTI corresponding to the specific service (TMGI).

In addition, the eNB 200 may arrange in the group search space in the PDCCH the second resource allocation information transmitted by applying the G-RNTI. The group search space is a new search space which is different from a common search space and a UE unique search space. The UE 100 which tries to receive the SC-PTM data corresponding to the specific service (TMGI) performs blind decoding by the G-RNTI in the group search space.

In step 10, the eNB 200 transmits the SC-PTM data corresponding to the specific service (TMGI) via the PDSCH (DL-SCH).

[Modified Example of First Embodiment]

In the above first embodiment, a "Modification period" indicates a period during which a GCCH (SC-PTM configuration information) is not changed. However, the "Modification period" may indicate an interval between given transmission and next transmission. For example, when "Modification Period=3" is configured, first transmission is performed, and then a next retransmission timing is a third timing of "Subframes scheduled to GCCH".

[Second Embodiment]

Differences of the second embodiment from the first embodiment will be mainly described below. The second embodiment is an embodiment in the case where HARQ is applied to SC-PTM transmission.

(Outline of HARQ)

HARQ is a technique of improving communication quality of a channel by a combination of ARQ and error correction. Particularly, synthesizing a reception result of first transmission and a reception result of retransmission upon retransmission makes it possible to improve quality.

An example of a retransmission method will be described. When a UE 100 cannot correctly decode received data, in other words, when a CRC (Cyclic Redundancy Check) error occurs, the UE 100 transmits "Nack" to an eNB 200. Upon receiving "Nack", the eNB 200 retransmits the data. On the other hand, when the UE 100 can correctly decode the received data, in other words, when the CRC error does not occur, the UE 100 transmits "Ack" to the eNB 200.

An example of the HARQ scheme is Chase combining. The Chase combining is the scheme of transmitting the same data upon the first transmission and the retransmission, and is a scheme of improving a gain by synthesizing the data of the first transmission and the data of the retransmission upon retransmission. Another example of the HARQ scheme is IR (Incremental redundancy). The IR increases redundancy. By transmitting a parity bit in the retransmission, the IR increases the redundancy in combination with the first transmission, and improves quality by the error correction function.

(Operation Sequence)

Next, the operation sequence according to the second embodiment will be described in the order of operation patterns 1 to 3. In the second embodiment, the eNB 200 performs first transmission by applying a G-RNTI, and the UE 100 receives the first transmission by applying the G-RNTI.

In the operation patterns 1 and 2, the eNB 200 performs retransmission by applying a RNTI different from the G-RNTI applied for the first transmission. In the operation pattern 3, the eNB 200 performs retransmission by applying the same RNTI as the G-RNTI applied for the first transmission.

(1) Operation Pattern 1

Figure 10:
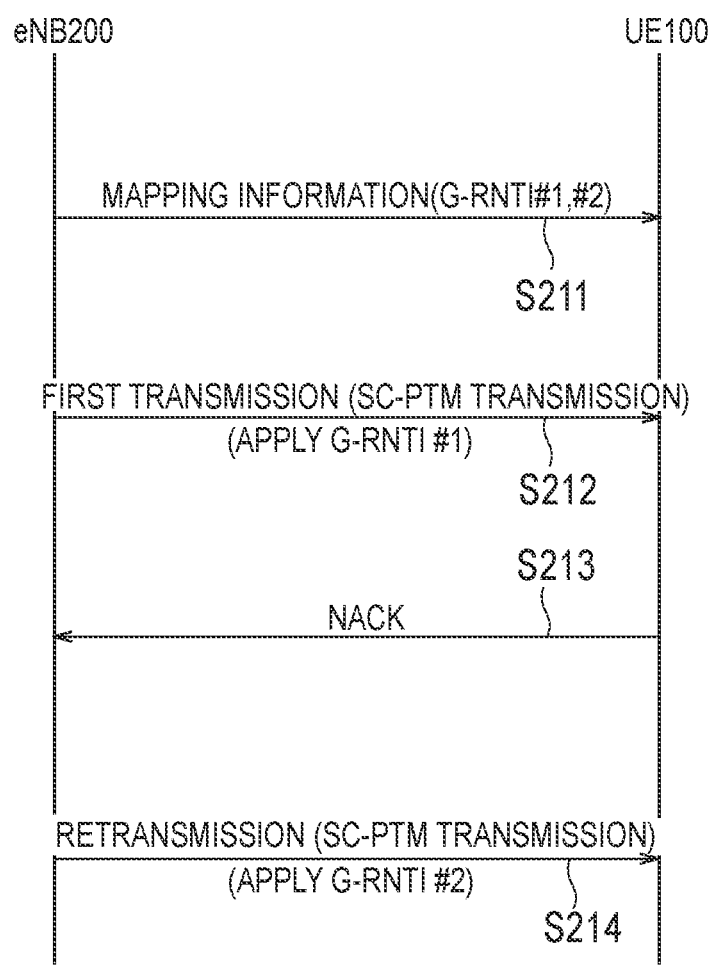
FIG. 10 is a sequence diagram illustrating an operation pattern 1 according to a second embodiment.
Figure 11:
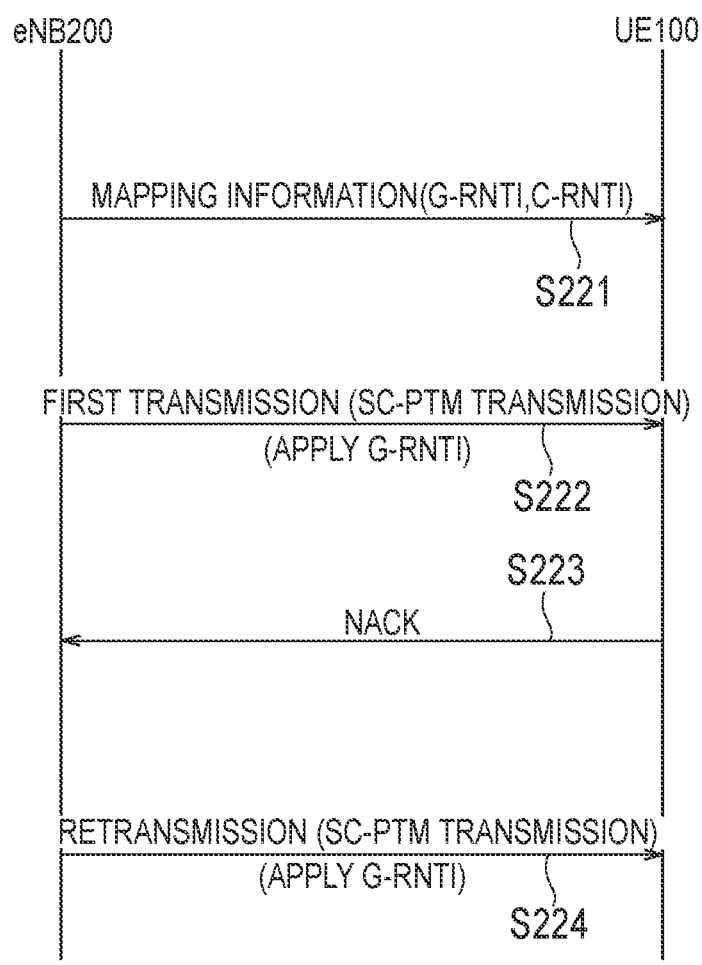
FIG. 11 is a sequence diagram illustrating an operation pattern 2 according to the second embodiment.
Figure 12:
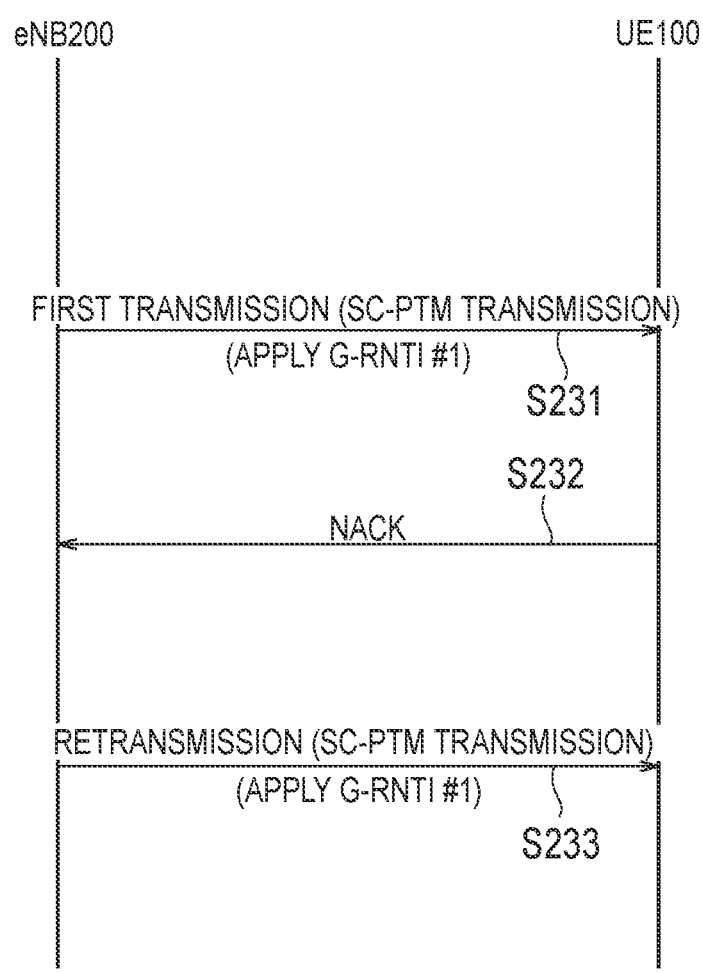
FIG. 12 is a sequence diagram illustrating an operation pattern 3 according to the second embodiment.

FIG. 10 is a sequence diagram illustrating the operation pattern 1 according to the second embodiment. FIGS. 10 to 12 are views illustrating the only one UE 100 belonging to a multicast group. However, in reality, a plurality of UEs 100 belongs to the multicast group.

As illustrated in FIG. 10, in step S211, the eNB 200 notifies the UE 100 which belongs to the multicast group of a correspondence (mapping information) between the G-RNTI applied to first transmission and the RNTI applied to the retransmission. In the operation pattern 1, the G-RNTI (G-RNTI #2) different from the G-RNTI (G-RNTI #1)

applied for first transmission is applied to retransmission. The mapping information may be transmitted via the GCCH. Also, the mapping information may be associated with TMGI. The UE 100 receives and stores the mapping information.

In step S212, the eNB 200 performs the first transmission by SC-PTM transmission by applying the G-RNTI #1. More specifically, the eNB 200 transmits resource allocation information (DCI) by a PDCCH scrambled/masked by the G-RNTI #1, and then transmits SC-PTM data on a PDSCH (DL-SCH) according to the resource allocation information.

Here, it is assumed that the UE 100 cannot correctly decode the SC-PTM data and transmits Nack to the eNB 200 (step S213).

In step S214, the eNB 200 performs the retransmission by SC-PTM transmission by applying the G-RNTI #2. More specifically, the eNB 200 transmits the resource allocation information (DCI) by the PDCCH scrambled/masked by the G-RNTI #2, and then transmits retransmission data on the PDSCH (DL-SCH) according to the resource allocation information. The UE 100 which is a transmission source of Nack receives the resource allocation information, and then receives the retransmission data.

The eNB 200 may perform first transmission and retransmission by applying different MCSs. For example, the eNB 200 performs the retransmission by applying the MCS having a higher error tolerance than the MCS applied for the first transmission. In addition, the eNB 200 may perform the first transmission and the retransmission by applying different numbers of resource blocks (RB). For example, the eNB 200 performs retransmission by applying a larger number of RBs than the number of RBs applied for the first transmission.

Further, the eNB 200 may perform retransmission by MU-MIMO (Multi User MIMO). For example, the eNB 200 directs a beam to the UE 100 which is the transmission source of Nack, directs a null directed to the other UEs 100 and transmits retransmission data.

(2) Operation Pattern 2

FIG. 11 is a sequence diagram illustrating an operation pattern 2 according to the second embodiment. Overlapping description of the same operation as the above-described operation pattern will be omitted.

As illustrated in FIG. 11, in step S221, the eNB 200 notifies the UE 100 which belongs to the multicast group of a correspondence (mapping information) between the G-RNTI applied for first transmission and the RNTI applied for the retransmission. In the operation pattern 2, a C-RNTI (Cell-Radio Network Temporary Identifier) which differs per UE 100 is applied to retransmission. The mapping information may be transmitted via the GCCH. Also, the mapping information may be associated with the TMGI. The UE 100 receives and stores the mapping information.

In step S222, the eNB 200 performs the first transmission by SC-PTM transmission by applying the G-RNTI.

Here, it is assumed that the UE 100 cannot correctly decode the SC-PTM data and transmits Nack to the eNB 200 (step S223).

In step S224, the eNB 200 performs retransmission by unicast transmission by applying a C-RNTI. More specifically, the eNB 200 transmits the resource allocation information (DCI) by the PDCCH scrambled/masked by the C-RNTI, and then transmits retransmission data on the PDSCH (DL-SCH) according to the resource allocation information. The UE 100 which is a transmission source of Nack receives the resource allocation information, and then receives the retransmission data.

Similar to the operation pattern 1, the eNB 200 may perform the first transmission and the retransmission by applying different MCSs and different numbers of RBs. Further, the eNB 200 may perform retransmission by MU-MIMO.

Furthermore, the eNB 200 may perform retransmission by applying a TM different from a TM (Transmission Mode) applied for the first transmission. For example, the eNB 200 performs retransmission by applying a TM having higher error tolerance than a TM applied for the first transmission. In the TM, the following "Transmission Mode 1" to "Transmission Mode 8" exists.

Transmission Mode 1: Single antenna port, port 0
Transmission Mode 2: Transmit diversity
Transmission Mode 3: Large-delay CDD
Transmission Mode 4: Closed-loop spatial multiplexing
Transmission Mode 5: MU-MIMO
Transmission Mode 6: Closed-loop spatial multiplexing, single layer
Transmission Mode 7: Single antenna port, UE-specific RS (port 5)
Transmission Mode 8: Single or dual-layer transmission with UEspecific RS (ports 7 and/or 8)

Alternatively, when retransmission is performed by applying the TM different from the TM applied for the first transmission, the eNB 200 may perform retransmission by applying a TM suitable for unicast. For example, 1 layer transmission (the TM 4 or the TM 6) or beam forming (TM 8) of Closed Loop is not suitable for multicast. However, in the case of unicast, the TM 4 or the TM 6 has better characteristics than Transmit diversity as long as a PMI (Precoding Matrix Indicator) is fed back. Also, in the case of unicast, the TM 8 has better characteristics than Transmit diversity as long as the eNB 200 grasps a CSI.

An operation example illustrated in FIG. 11 assumes that a "retransmission C-RNTI of SC-PTM" different from the C-RNTI used for normal unicast is newly allocated to a UE. In this case, the "retransmission C-RNTI of the SC-PTM" may have a different name from the "C-RNTI".

Alternatively, instead of the "retransmission C-RNTI of the SC-PTM", the SC-PTM may be retransmitted by the C-RNTI used for normal unicast. In this case, in step S221, mapping information of the "G-RNTI applied for the first transmission, the RNTI applied to the retransmission, and an identifier for identifying SC-PTM data (e.g., HARQ Process ID)" is notified. When the normal C-RNTI is used, normal unicast data which is not the SC-PTM data is also transmitted. Therefore, it is necessary to identify that the transmitted data is the SC-PTM. For example, assuming DL of FDD, one of eight HARQ Process ID s 0 to 7 is associated with the SC-PTM data transmitted by a given G-RNTI. In this case, the UE in the multicast group which uses this G-RNTI has a HARQ Process ID which is commonly reserved for the SC-PTM. In the case of a UE to which a plurality of G-RNTIs is allocated (i.e., the UE belonging to a plurality of multicast groups), it is also possible to allocate a plurality of HARQ Process ID s to a plurality of G-RNTIs.

When retransmission is performed by using the C-RNTI, one of the following 1) to 3) is preferably performed on a NDI (New Data Indicator) in a DCI for DL Scheduling (downlink resource allocation) which uses the C-RNTI corresponding to the HARQ Process ID of the SC-PTM data.

1) The UE which has received the DCI ignores the NDI.
2) The NDI is interlocked with the NDI upon the first transmission (when the NDI in the DCI of the first transmission which uses the G-RNTI is 0, the NDI in the DCI of the retransmission which uses the C-RNTI is also 0, and when the NDI is 1, the NDI is 1).

3) A new DCI format which does not include the NDI is defined.

(3) Operation Pattern 3

FIG. 12 is a sequence diagram illustrating the operation pattern 3 according to the second embodiment. Overlapping description of the same operation as the above-described operation pattern will be omitted.

As illustrated in FIG. 12, in step S231, the first transmission is performed by SC-PTM transmission by applying the G-RNTI #1.

Here, it is assumed that the UE 100 cannot correctly decode the SC-PTM data and transmits Nack to the eNB 200 (step S232).

In step S234, the eNB 200 performs the retransmission by SC-PTM transmission by applying the G-RNTI #1. The UE 100 which has successfully received the first transmission in step S231 or has transmitted Ack in step S232 may omit reception of the retransmission data. Here, similar to unicast, whether transmitted data is transmitted for the first time or retransmitted can be decided based on the NDI in the DCI.

[Modified Example of Second Embodiment]

In operation pattern 2 according to the second embodiment, the first transmission and the retransmission may not be performed simultaneously (by using the same subframe) to make it possible to easily identify the HARQ process.

In the operation patterns 1 and 2, the UE 100 which has successfully received the first transmission may receive simultaneously transmitted unicast data based on the C-RNTI addressed to the UE 100 without receiving the SC-PTM retransmission data when receiving the DCI for retransmission.

[Other Embodiments]

The above first embodiment and second embodiment may be separately and independently carried out or may be carried out in combination with each other.

In each of the above embodiments, the LTE system has been exemplified as the mobile communication system and the LTE communication has been exemplified as the WWAN communication. However, the present disclosure is not limited to the LTE system. The present disclosure may be applied to mobile communication systems other than the LTE system.

[Additional Statement 1]

(1. Introduction)

The new study item on support of single-cell point-to-multipoint (SC-PTM) transmission is approved and the initial discussion of the study is started. In this additional statement, the possible radio interface enhancements are discussed and evaluated to support effective SC-PTM transmission.

(2. Discussion)

(2.1. Building Blocks for Enhanced Radio Interface)

Several agreements/conclusions as the result of the initial discussion on SC-PTM transmission. In the agreements/conclusions, some assumptions for DRX operation in this study was found as follows;

In the study we cover IDLE and Connected mode support

Agreements

1 RAN2 assumes that SC-PTM reuses the eMBMS system architecture and acts as a complementary bearer type of eMBMS.

LS to SA2 and RAN3

At RAN2#89, RAN2 discussed the newly approved Study Item "Support of Single-cell PTM transmission in LTE" (see RP-142205), which study provisioning of multicast via PDSCH on a per cell basis, as distinct from providing multicast via PMCH over the whole MBSFN area. The SC-PTM transmission is intended to rely on the existing MBMS nodes (i.e. BM-SC, MBMS-GW, and MCE) as well as the interfaces between these nodes.

According to the agreements, the UEs in both IDLE and CONNECTED mode need to receive SC-PTM transmission which is corresponding to an MBMS bearer and finally mapped to PDSCH.

Observation 1: The UE in both IDLE and CONNECTED mode needs to receive SC-PTM transmission.

Observation 2: SC-PTM transmission corresponding to an MBMS bearer is mapped on PDSCH.

(2.2.) User Plane Aspects

In RAN2#89, some companies pointed out that RAN2 had already agreed but finally removed the outlines of SC-PTM transmission in Rel-8 discussions. We think the descriptions in TS36.300 V8.9.0 are still useful even if the use cases and assumptions may be different from Rel-8's one, e.g., applications to group/critical communications. Especially, the following sentences can be reused as the baseline of SC-PTM transmission, from L2 U-plane perspective;

15.3.2 Single-Cell Transmission

Single-cell transmission of MBMS is characterized by:
[ . . . ]

MTCH and MCCH are mapped on DL-SCH for p-t-m transmission; [ . . . ]

Multiple UEs can [ . . . ], and HARQ retransmissions are made on DL-SCH using a group (service specific) RNTI in a time frame that is co-ordinated with the original MTCH transmission. All UEs are able to receive the retransmissions and combine them with the original transmissions at the HARQ level. [ . . . ]

For single-cell transmission, an eNB is not required to comply with the stringent timing requirements indicated by SYNC protocol. The following principles still applies for the single transmission:

[ . . . ]

3. The segmentation/concatenation is needed for MBMS packets and should be totally up to the RLC/MAC layer in eNB, without taking into account any indication in the SYNC protocol.

The MTCH was assumed to be mapped on DL-SCH after segmentation/concatenation in RLC, and the DL-SCH was identified by a group RNTI (G-RNTI) which was allocated to specific service (i.e., TMGI). Under the assumption, it may be useful to assign a single RLC to a specific TMGI, so one TMGI should be allocated to a specific LCID and a specific G-RNTI. In addition, as same as the existing MBMS, the RLC corresponding to SC-PTM should be only UM mode. The handling of MAC (especially HARQ) will depends on the LS response with regard to PHY feedbacks, so it should be kept FFS.

Observation 3: An MBMS service is allocated to an RLC UM entity with an LCID.

Proposal 1: An MBMS service should be mapped to a DL-SCH with a specific G-RNTI.

Figure 13:
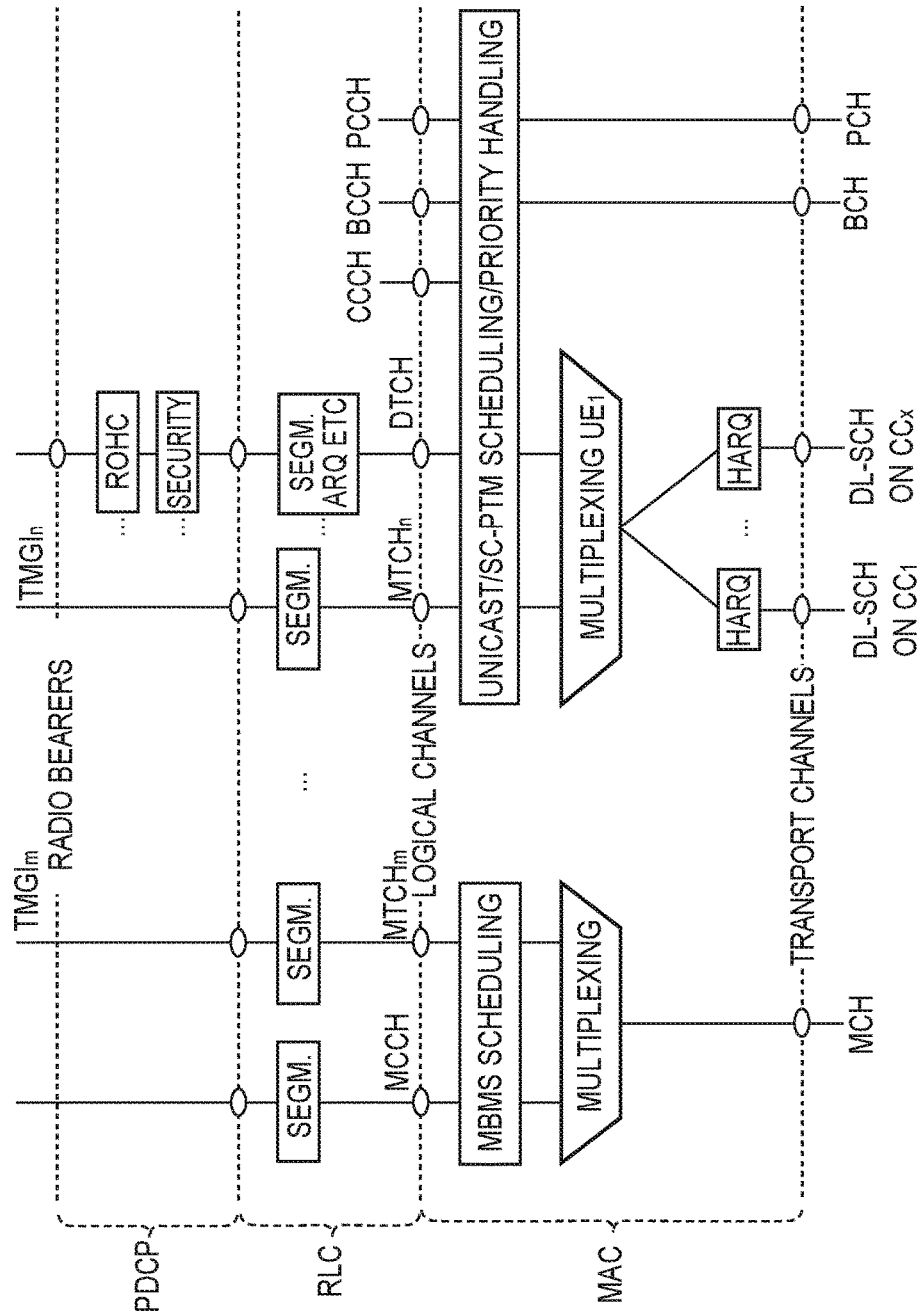
FIG. 13 is a view illustrating an L2 structure (U plane) having SC-PTM transmission according to a supplementary note.

FIG. 13 illustrates L2 structure with SC-PTM transmission (U-plane).

(2.3. Control Plane Aspects)

(2.3.1. Essential Information)

Necessary information to receive SC-PTM transmission is suggested. Besides the details of contents, the possible information could be summarized as follows.

The mapping of TMGI (optionally session ID) to G-RNTI and LCID

Scheduling information (e.g. time/frequency resource, MCS, modification/repetition period.)

Change notification

With regard to the time/frequency resource and MCS scheduling information, since SC-PTM is mapped to PDSCH, PDCCH should provide the scheduling information associated with the allocated PDSCH resource.

Proposal 2: PDCCH should provide the detailed information of resource allocation, such as time/frequency resource and MCS.

On the other hand, the UE in DRX needs only occasions of SC-PTM (or corresponding L2/L3 control channel, e.g., MCCH), like MBSFN subframes.

Proposal 3: To realize the efficiency of DRX, RRC should provide the subframe occasions of SC-PTM transmission or a corresponding control channel.

As a working assumption for mapping of the information to control channels, it should be considered whether each of the control information should be MBMS Area-specific or cell-specific. With MBMS, the control information is associated with the MBMS SCHEDULING INFORMATION, MCCH modification period, the mapping of TMGI to LCID, MBSFN subframe, MCS and so on. Considering SC-PTM is cell specific operation, the mapping of the TMGI to G-RNTI should be configured with cell specific value as a basic assumption while the TMGI mapping to the LCID should be applicable to all cells within an MBMS area since it is configured as part of the M2AP.

Proposal 4: The mapping of TMGI to LCID should be applicable to all cells within an MBMS Area (e.g., by the MCE).

Proposal 5: The G-RNTI, scheduling information and change notification should be decided as cell-specific configurations by the serving cell.

Figure 14:
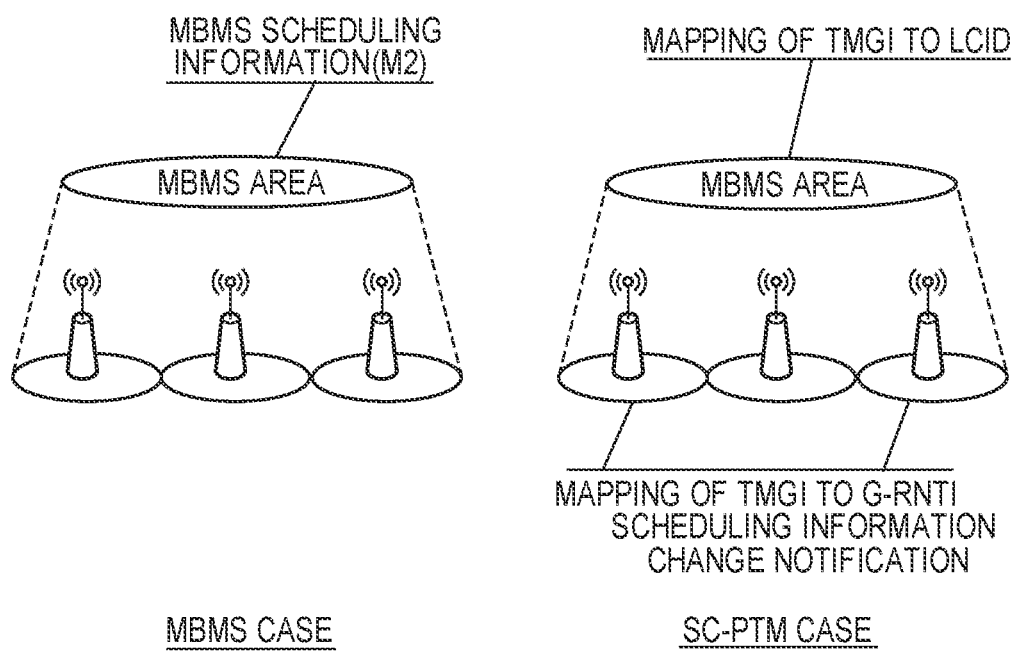
FIG. 14 is a view illustrating configurations unique to a MBMS area and a cell for SC-PTM according to the supplementary note.

FIG. 14 illustrates MBMS Area specific and cell specific configurations for SC-PTM.

(2.3.2. Possible Mechanisms for Delivering Control Information)

Figure 15:
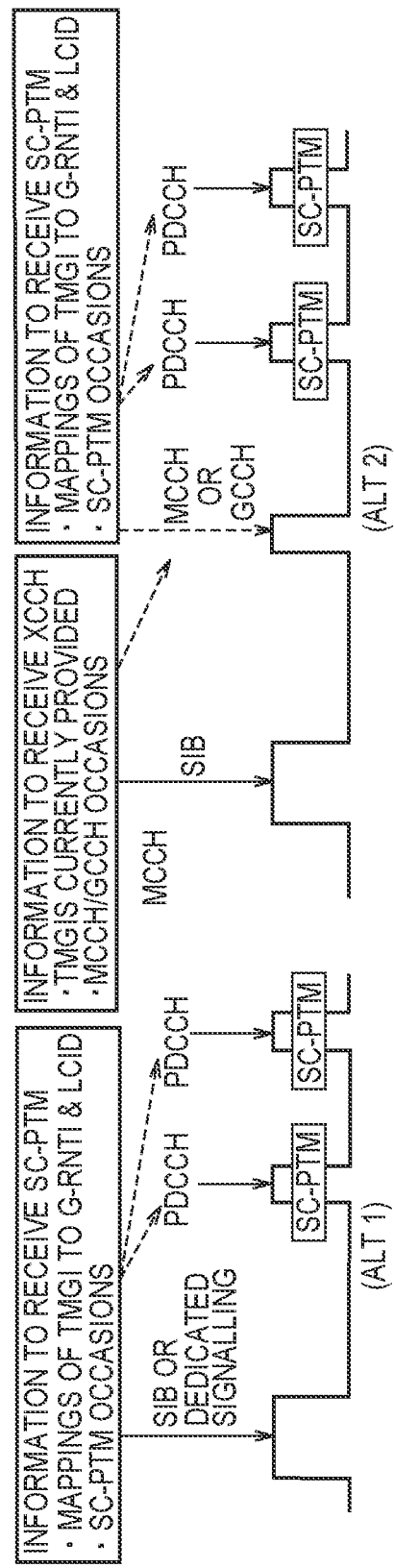
FIG. 15 is a view illustrating a three-step approach (ALT 1) and a two-step approach (ALT 2) according to the supplementary note.
Figure 16:
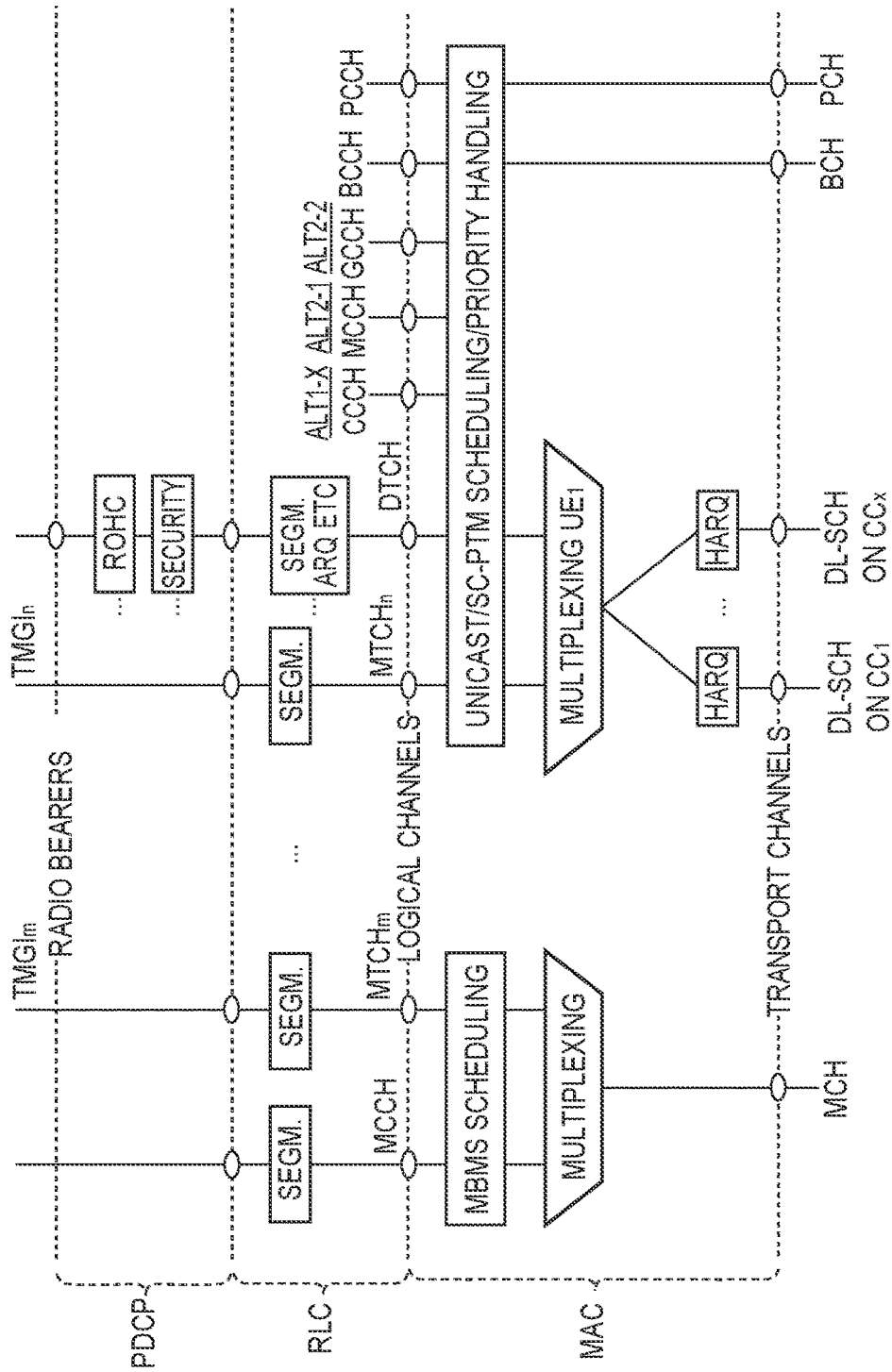
FIG. 16 is a view illustrating an L2 structure (having C plane options) of the SC-PTM transmission according to the supplementary note.

Some companies have proposed mechanisms to provision the control signalling towards the UE, i.e., SIB-based, MCCH-based and/or dedicated signalling-based mechanisms. Additionally, it is also suggested that an SPS-based mechanism should be considered as a means to support DRX operation. In summary, these mechanisms are depicted in FIGS. 15 and 16 and may be categorized into two general approaches:

Alt 1: One step approach;

Alt 1-1: With extended SIB13 or a new SIB;

With Alt 1-1, all necessary control information, except for the change notification, is provided by this SIB. Using the information provided by this SIB the UE will be able to monitor the PDCCH associated with the SC-PTM subframes. Changes to the SIB may happen at BCCH modification period and may force the UE to acquire all system information even if the other system information does not change.

Alt 1-2: With dedicated signalling;

Alt 1-2 is similar in principle to Alt 1-1, but the information is provided by dedicated signalling. With Alt 1-2 IDLE UEs will need to transition to CONNECTED to acquire the necessary configurations. In addition, this may mean that some form of interest indication from the UE will be needed in order for the serving cell to determine which UEs need to be configured.

Alt 2: Two steps approach;

Alt 2-1: With extended MCCH;

Alt 2-1 reuses the existing MCCH principles that the necessary information to acquire MCCH is provided by SIB and the UE attempts to receive SC-PTM based on the detailed configuration provisioned by MCCH. The complexity and standardization efforts may be increased compared to Alt 1-1. Note that MCCH for SC-PTM should be mapped to PDSCH to eliminate MBSFN subframe allocation for SC-PTM.

Alt 2-2: With a new GCCH (Group Control Channel); Alt 2-2 is similar in principle to Alt 2-1 but uses a new GCCH to provide the information for SC-PTM reception. This alternative may have the greatest specification impact among all the alternatives.

FIG. 15 illustrates One step approach (Alt 1) and Two steps approach (Alt 2).

FIG. 16 illustrates L2 structure with SC-PTM transmission (with C-plane alternatives).

(2.3.3.) Evaluation of Control Plane Mechanism Alternatives

The evaluation should take into account the conclusion that "We will evaluate the SC-PTM against the GCSE requirements (should also consider MCPTT requirements if available)". The GCSE study and MCPTT requirements are well summarized and it quotes the GCSE could meet MCPTT requirements, which evaluated the scenario to use Unicast for group communications, therefore, for both transmitting and receiving UEs. On the other hand, in SC-PTM study, it was agreed that "RAN2 assumes that SC-PTM reuses the eMBMS system architecture and acts as a complementary bearer type of eMBMS". Furthermore, RAN2 should focus on receiving UE's latency evaluation. With SC-PTM, the latency performance for both transmitting and receiving UEs should be comparable to that of the existing Unicast service in Rel-12 GCSE as measured by the metrics specified in section 5.2.1 and reproduced in part in the Annex below.

Proposal 6: From transmitter UE perspective, SC-PTM should have the same latency performance as Unicast based on the results already evaluated in the GCSE study.

Considering discussion above, Table 1 shows pros and cons of each alternative.

Table 1 Comparison of control plane alternatives

TABLE 1

| | Alt 1-1:<br>SIB13 or new SIB | Alt 1-2:<br>Dedicated signalling | Alt 2-1:<br>Extended MCCH | Alt 2-2:<br>GCCH |
|---|---|---|---|---|
| New bearer setup latency (*1) | BCCH modification period ☹<br>At least 64 radio frames as configured by modificationPeriodCoeff * defaultPagingCycle | RRC Connection Establishment (for IDLE UEs) + RRC Connection Reconfiguration (for all UEs) ☺<br>35 subframes for IDLE UEs and 15 subframes for CONN UEs as processing delay Additional time must be allocated if an interest indication is needed. | MCCH modification period ☹<br>At least 512 radio frames as configured by mcch-ModificationPeriod | GCCH modification period ☺<br>Can be newly defined |

TABLE 1-continued

| | Alt 1-1:<br>SIB13 or new SIB | Alt 1-2:<br>Dedicated signalling | Alt 2-1:<br>Extended MCCH | Alt 2-2:<br>GCCH |
|---|---|---|---|---|
| New UE joins late in on-going SC-PTM (*2) | SI periodicity ☺<br>At least 8 radio frames as configured by si-Periodicity | RRC Connection Reconfiguration ☺<br>15 subframes as processing delay<br>Additional time must be allocated if an interest indication is needed. | MCCH repetition period ☹<br>At least 32 radio frames as configured by mcch-RepetitionPeriod | GCCH repetition period ☺<br>Can be newly defined |
| NW and UE complexity | One step ☺ | One step ☺<br>If an interest indication is needed, two steps ☹ | Two steps ☹ | Two steps ☹ |
| Backward compatibility | Should be considered ☺ | No need ☺ | Should be considered ☹ | No need ☺ |
| UE battery consumption | Low ☺ | High ☹<br>Due to UE transmissions. | Mid or low ☺ | Mid or low ☺ |

(*1) The latency from SC-PTM transmission changes (e.g., an MBMS service starts) to the UE starts receiving SC-PTM.

(*2) The latency from the time UE is interested in the MBMS service to the time UE starts receiving the service over SC-PTM.

With regard to latency performances, all alternatives are feasible and have similar or even better performance compared to Unicast or MBMS under Rel-12GCSE. From the complexity perspective for control information acquisition, Alt 1-x is simpler and works seamlessly for IDLE UEs, but for Alt 1-2 with dedicated signalling further discussion is needed to determine if some sort of Interest Indication is needed. Alt 2-x is similar to Rel-12 GCSE with MBMS so it could potentially work well with UEs that also need to support the existing MBMS. As for backward compatibility, there are no impacts with either Alt 1-2 or Alt 2-2, and these alternatives are more flexible and have reduced latency impacts, although specification impact will increase. Regarding UE power consumption, Alt 1-2 with dedicated signalling has the greatest impact to UE power consumption due to the need for the transmission of interest indication.

Although each alternative has its pros and cons, we prefer Alt 2-2 with GCCH to optimize UE battery consumption and it could potentially support faster bearer setup without backward compatibility issues as compared to Alt 2-1. Alt 1-2 with dedicated signalling should be FFS since it may be useful for some scenarios, e.g., mobility. Alt 1-1 may also be considered, but it cannot support fast bearer setup due to the restriction with the BCCH modification period.

Proposal 7: The new GCCH should be defined and it provides the UEs of necessary information to receive SC-PTM transmission.

(2.3.4.) Proposed Procedure with GCCH (Alt 2-2)

Figure 17:
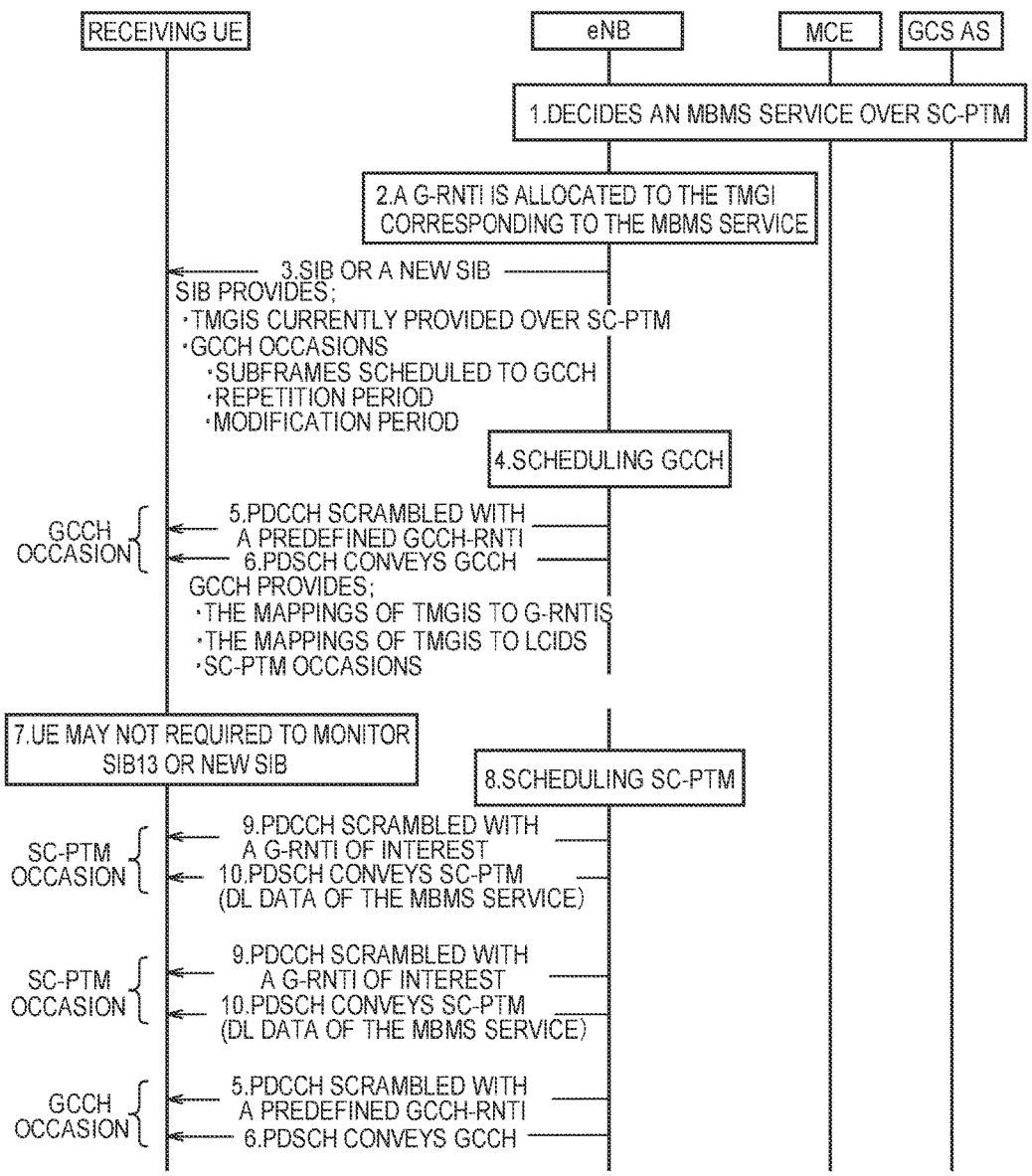
FIG. 17 illustrates a signaling procedure including a GCCH according to the supplementary note.

FIG. 17 describes a signalling procedure with GCCH. The descriptions of each step are provided as follows;

Step 1: An MBMS service is decided to be provided over SC-PTM. Which entity should decide on SC-PTM is currently pending decision from RAN3/SA2.

Step 2: The eNB allocates a G-RNTI to the TMGI corresponding to the MBMS service.

Step 3: SIB13 or a new SIB provides configurations related to GCCH reception. This SIB provides "TMGIs currently provided over SC-PTM" which triggers the UE interested in the TMGI to acquire GCCH. TMGI is also used by the UE much like the MBMS SAI listed in SIB15 for MBSFN whereby the information may be used for service continuity in the mobility scenario.

SIB13 or the new SIB will also include the GCCH occasions containing the subframes scheduled for GCCH, as well as the GCCH repetition period and the modification period. Once the UE acquires GCCH it may be no longer required to monitor GCCH during the modification period, which allows the UE to reduce power consumption.

Step 4: The eNB performs scheduling of GCCH according to GCCH modification period and repetition period Step 5: Within the GCCH occasion, the eNB transmits PDCCH scrambled with GCCH-RNTI which is predefined and common value for all UEs, similar to P-RNTI. The PDCCH indicates the RBs allocated within PDSCH.

Step 6: The eNB transmits within PDSCH GCCH contents within the same subframe.

The GCCH includes the mappings of TMGIs to G-RNTIs, which allows the UE to determine which G-RNTI is allocated to the TMGI of interest. Additionally, the mappings of TMGIs to LCIDs are also included.

The GCCH also includes the SC-PTM occasions which indicate the subframes scheduled for SC-PTM transmission, similar to MBSFN subframe configuration. By providing the SC-PTM occasions, the UE will not need to monitor all subframes in case the UE is only interested in SC-PTM transmissions.

Step 7: The UE may not be required to monitor SIB13 or the new SIB once it acquires GCCH, unless SIB update is performed. The UE is only required to monitor GCCH once within each GCCH modification period, similar to MCCH. This allows the UE to reduce power consumption.

Step 8: The eNB performs scheduling of SC-PTM.

Step 9: Within the SC-PTM occasion, the eNB transmits PDCCH scrambled with a G-RNTI corresponding to a specific TMGI. Note that it's up to the eNB whether the SC-PTM resource is actually allocated, and it's indicated by corresponding PDCCH availability as it is today.

Step 10: The eNB transmits PDSCH conveying SC-PTM corresponding to the TMGI.

Proposal 8: The above GCCH procedure and steps should be captured in TR36.890.

[Additional Note]

(1. Introduction)

The new study item on support of single-cell point-to-multipoint (SC-PTM) transmission is approved. For the critical communication and the commercial use cases such as top videos/popular apps download, mobile advertising and traffic information for cars, the study item will investigate more flexible/efficient radio interface for group communication, comparing to Rel-12 eMBMS-based mechanism. One of the big challenges in the Rel-13 study is expected as "dynamic multicast" over PDSCH, where the objective of study was identified as follows;

Method for UE to receive the DL multicast over PDSCH that is intended for a group of users (i.e. users that have common interest on a particular service/content).

Whether HARQ feedback and CSI report are still necessary for single-cell PTM transmission, and if so identify possible solutions.

Service continuity aspects.

In this additional statement, the possible issues with DRX operation are identified from the perspective of SC-PTM reception over PDSCH.

(2. Discussion)

Agreements related to DRX operation

Several agreements/conclusions as the result of the initial discussion on SC-PTM transmission are reached. In the agreements/conclusions, some assumptions for DRX operation in this study was found as follows;

In the study we cover IDLE and Connected mode support

1) RAN2 discussed what gains could be achieved with link adaptation and HARQ (re)transmissions if group members can provide e.g. CSI/HARQ feedback. RAN2 would like RAN1 to evaluate e.g. CSI/HARQ feedback in response to SC-PTM transmissions on PDSCH.

At RAN2#89, RAN2 discussed the newly approved Study Item "Support of Single-cell PTM transmission in LTE" (see RP-142205), which studies provisioning of multicast via PDSCH on a per cell basis, instead of providing multicast via PMCH over the whole MBSFN area. RAN2 assumes that SC-PTM reuses the MBMS system architecture and acts as a complementary bearer type of MBMS. RAN2 is targeting GCSE requirements (and MCPTT if available) for the SC-PTM transmission.

According to the agreed sentences above, IDLE UEs should decode PDSCH to receive SC-PTM transmission, as well as CONNECTED UEs. Therefore, it should be studied how to ensure SC-PTM reception with DRX operation.

Observation 1: The UE in both IDLE and CONNECTED mode needs to receive SC-PTM transmission.

Observation 2: SC-PTM transmission is mapped on PDSCH.

PDCCH monitoring opportunity for SC-PTM with DRX

Considering SC-PTM transmission uses PDSCH and should ensure improved radio efficiency, it's natural to assume PDCCH for resource allocation of PDSCH conveying SC-PTM. In this assumption, the following issues such as DRX, and PDCCH monitoring should be considered.

Comparing to eMBMS reception which is performed independent of DRX, one of the challenges in the SC-PTM reception in the connected mode is to allow the reception to work within the existing DRX mechanism. The challenges stems from subframe alignment between DRX and single-cell PTM. While the MBSFN subframes are completely separate from normal subframes, the SC-PTM transmissions occur within normal subframes since it's mapped to the PDSCH and scheduled by PDCCH.

In the current idle mode procedure, the UE is required to monitor PDCCH only in the paging occasion which is randomized by UE-ID, while the UE in connected mode is required to monitor PDCCH during Active Time and controlled by the serving cell through dedicated signalling. Further discussion is needed to determine the SC-PTM transmission occasions that would be applicable for all UEs within the same group. In other words, the opportunities for PDCCH monitoring should be aligned for all UEs assigned to the same group.

Proposal 1: RAN2 should discuss how to provide sufficient opportunities for PDCCH monitoring for all UEs assigned to the same group.

The following alternatives may be considered;

ALT 1: Extend the existing DRX mechanisms in the idle mode and in the connected mode.

ALT 2: Introduce a new DRX mechanism independent of the existing DRX mechanisms.

ALT 3: Leave up to smart eNB implementation.

ALT 1 may be considered the baseline mechanism, although the issue may have impacts on backward compatibility from the eNB's point of view, i.e., it may be difficult to change the DRX occasions especially in the idle mode.

ALT 2 may be a simpler way if the DRX rule relates to some sort of group ID, e.g., TMGI or Group-RNTI, although more standardization efforts are expected.

ALT 3 may be considered the simplest alternative from the standardization perspective. However, it should be considered how the eNB knows the UE-IDs of IDLE UEs belonging to the same group and how the paging occasions should be aligned to the DRX OnDurations for all UEs in the connected mode.

Due to the difficulty in supporting all UEs interested in the data delivery in ALT 3 and the impact to backwards compatibility in ALT1, RAN2 should consider whether a new DRX mechanism would be needed to support SC-PTM receptions for both IDLE and CONNECTED UEs.

Proposal 2: Introduce a new DRX mechanism independent of the existing DRX mechanism for the SC-PTM reception of PDSCH.

Possible DRX mechanism for SC-PTM

If Proposal 2 is acceptable, three options may be considered to align PDCCH monitoring opportunity for SC-PTM reception.

Option 1: Semi-Persistent Scheduling (SPS)-Based Mechanism;

The existing SPS mechanism can be one of possible baselines for the SC-PTM DRX configuration. According to the current specification [5][6], the PDSCH is semi-persistently allocated in the Nth subframes for which;

$$(10*SFN+subframe)=[(10*SFNstart\ time+subframestart\ time)+N*semiPersistSchedIntervalDL]\ modulo\ 10240.$$

However, it's necessary to extend the mechanism in terms of, e.g, how to configure with SFNstart time, subframestart time and N, how to handle a UE late joining in an on-going group communication, and/or how to configure IDLE UEs.

Option 2: MCCH-Based Mechanism;

The possibility to reuse the existing MCCH-based mechanism for SC-PTM control information transfer, including the concept of GCCH is pointed out. With this option, the UE interested in SC-PTM reception may monitor a SIB (much like SIB13) which indicates the opportunities for GCCH reception. The GCCH contains the necessary control information including the information on when to start receiving SC-PTM transmission on PDSCH. From the DRX perspective, the necessary control information the GCCH may also include the subframes where SC-PTM transmission is scheduled, so that the UE would not need to monitor other subframes in case the UE isn't interested in any other services. Even if the subframes for SC-PTM transmissions are indicated in GCCH, whether SC-PTM is actually transmitted on a scheduled subframe is should still be based on the PDCCH within the subframes. This allows for a more dynamic allocation of resources for the serving cell.

Option 3: SIB-Based Mechanism;

With Option 3, a SIB will provide all the mapping information among TMGI, LCID and G-RNTI. It may also provide the subframes where SC-PTM may be transmitted. Changes to the SIB may happen at BCCH modification period.

Comparisons Among Options:

All three options have the common principle that the serving cell should inform the UEs in IDLE and CONNECTED of the subframes which the UEs should wake up to monitor PDCCH. The differences of the options pertain to whether the PDCCH points to the PDSCH conveying the control information or the SC-PTM data.

Option 1 has the potential for significant reduction in overhead in terms of UE configuration when compared with either Option 2 or Option 3. And both dedicated and system information configuration may be possible.

Although Option 2 and Option 3 are similar in principle, there are important differences that should be considered. With Option 2, the new SIB only provides the UE with opportunity to monitor PDCCH corresponding to GCCH. And in turn, the contents of GCCH (i.e., G-RNTI) will allow the UE to find the SC-PTM data. And with Option 3, the new SIB directly provides the UE with opportunity to monitor PDCCH corresponding to SC-PTM data Option 3 may appear to be straight-forward but it doesn't allow for fast bearer setup since the length of the BCCH modification period is limited by the default paging cycle. With Option 2, the GCCH modification period may be configured to be a value short enough for fast bearer setup.

Proposal 3: Regardless of which option is chosen, the serving cell should provide the occasion(s) for PDCCH monitoring that corresponds directly to or indirectly to SC-PTM transmission.

The invention claimed is:

1. A base station comprising:
   a controller configured to provide multicast service by SC-PTM (Single Cell Point to Multi-point) transmission; and
   a transmitter configured to transmit SC-PTM configuration information related to a configuration of the SC-PTM transmission via a SC-PTM control channel which is a logical channel different from a MCCH (Multicast Control Channel), and further configured to transmit multicast data via a traffic channel for the SC-PTM transmission,
   wherein each of the SC-PTM control channel and the traffic channel is mapped on a DL-SCH (Downlink Shared Channel),
   DRX (Discontinuous Reception) is applied to reception of the traffic channel in the SC-PTM transmission,
   the SC-PTM configuration information includes DRX-related information indicating subframes in which multicast data is likely to be transmitted by the SC-PTM transmission via the traffic channel,
   the transmitter is configured to transmit a system information block related to the SC-PTM control channel via a BCCH (Broadcast Control Channel),
   the transmitter is further configured to transmit first resource allocation information for transmitting the SC-PTM configuration information via a PDCCH (Physical Downlink Control Channel), wherein a predetermined RNTI (Radio Network Temporary Identifier) for the SC-PTM control channel is applied to transmission of the first resource allocation information, and
   the transmitter is further configured to transmit second resource allocation information for transmitting multicast data by the SC-PTM transmission via the PDCCH, wherein a G-RNTI (Group-RNTI) different from the predetermined RNTI is applied to transmission of the second resource allocation information.

2. The base according to claim 1, wherein
   the SC-PTM configuration information further includes information indicating a correspondence between a TMGI (Temporary Mobile Group Identity) indicating the multicast service and a G-RNTI (Group-Radio Network Temporary Identifier).

3. The base station according to claim 1, wherein
   the system information block includes information indicating a subframe for which the SC-PTM control channel is scheduled, and
   the system information block includes a modification period indicating a period during which the SC-PTM configuration information is not changed, and a repetition period indicating a transmission interval of the SC-PTM configuration information.

4. The base station according to claim 1, wherein
   the DRX applied to reception of the traffic channel in the SC-PTM transmission is an operation independent from a DRX applied to a unicast reception.

5. A user terminal for which multicast service is provided by SC-PTM (Single Cell Point to Multi-point) transmission, the user terminal comprising:
   a receiver configured to receive SC-PTM configuration information related to a configuration of the SC-PTM transmission via a SC-PTM control channel which is a logical channel different from a MCCH (Multicast Control Channel), and further configured to receive multicast data via a traffic channel for the SC-PTM transmission; and
   a controller configured to apply DRX (Discontinuous Reception) to reception of the traffic channel in the SC-PTM transmission,
   wherein each of the SC-PTM control channel and the traffic channel is mapped on a DL-SCH (Downlink Shared Channel),
   the SC-PTM configuration information includes DRX-related information indicating subframes in which multicast data is likely to be transmitted by the SC-PTM transmission via the traffic channel,
   the receiver is configured to receive a system information block related to the SC-PTM control channel via a BCCH (Broadcast Control Channel),
   the receiver is further configured to receive first resource allocation information for receiving the SC-PTM configuration information via a PDCCH (Physical Downlink Control Channel), wherein a predetermined RNTI (Radio Network Temporary Identifier) for the SC-PTM control channel is applied to reception of the first resource allocation information, and
   the receiver is further configured to receive second resource allocation information for receiving multicast data by the SC-PTM transmission via the PDCCH, wherein a G-RNTI (Group-RNTI) different from the predetermined RNTI is applied to reception of the second resource allocation information.

6. The user terminal according to claim 5, wherein
   the controller is configured to perform the DRX for the SC-PTM based on the SC-PTM configuration information,
   the DRX for the SC-PTM is an operation independent from a DRX for a unicast reception, and
   the DRX for the SC-PTM is associated with a G-RNTI (Group-Radio Network Temporary Identifier).

* * * * *